US008267457B2

(12) United States Patent
Yamada et al.

(10) Patent No.: US 8,267,457 B2
(45) Date of Patent: Sep. 18, 2012

(54) VEHICULAR SEAT DEVICE

(75) Inventors: Masayuki Yamada, Aichi-ken (JP); Makoto Ito, Aichi-ken (JP); Kenji Nakamura, Chiryu (JP)

(73) Assignee: Toyota Boshoku Kabushiki Kaisha, Kariya-shi, Aichi-ken (JP)

( * ) Notice: Subject to any disclaimer, the term of this patent is extended or adjusted under 35 U.S.C. 154(b) by 175 days.

(21) Appl. No.: 12/375,799

(22) PCT Filed: Jul. 27, 2007

(86) PCT No.: PCT/IB2007/002153
§ 371 (c)(1),
(2), (4) Date: Jan. 30, 2009

(87) PCT Pub. No.: WO2008/015526
PCT Pub. Date: Feb. 7, 2008

(65) Prior Publication Data
US 2009/0256379 A1    Oct. 15, 2009

(30) Foreign Application Priority Data
Jul. 31, 2006 (JP) ............................ 2006-207625

(51) Int. Cl.
*B60N 2/30* (2006.01)
(52) U.S. Cl. .................... 296/65.01; 297/331
(58) Field of Classification Search ......... 296/65.01, 296/65.05, 65.09; 297/378.1, 337, 337.331, 297/331
See application file for complete search history.

(56) References Cited

U.S. PATENT DOCUMENTS

| 3,966,253 | A  | * | 6/1976 | Berghof et al. | 297/367 R |
|-----------|----|---|--------|-----------------|-----------|
| 6,183,033 | B1 | * | 2/2001 | Arai et al.     | 296/65.09 |
| 6,196,613 | B1 | * | 3/2001 | Arai            | 296/65.13 |
| 6,375,245 | B1 | * | 4/2002 | Seibold et al.  | 296/65.03 |
| 6,511,129 | B1 | * | 1/2003 | Minor et al.    | 297/367 R |

(Continued)

FOREIGN PATENT DOCUMENTS

CN    1513696    7/2004

(Continued)

OTHER PUBLICATIONS

"Notification of Reasons for Refusal" dated Jun. 17, 2008, in Japanese Patent Application No. 2006-207625, filed Jul. 31, 2006.

(Continued)

*Primary Examiner* — Glenn Dayoan
*Assistant Examiner* — Pinel Romain
(74) *Attorney, Agent, or Firm* — Finnegan, Henderson, Farabow, Garrett & Dunner, LLP

(57) ABSTRACT

A vehicular seat device assumes, as seat arrangements, a seating state and in which an occupant can sit, an entry/exit state in which the seat cushion (12) is in a standing state, and a retracted state in which a seatback (14) is superimposed on an upper side of the seat cushion (12). The vehicular seat device has a first linking member (21), a second linking member (22) and a drive mechanism (16) that are capable of changing the posture of the seat cushion (12) synchronously with the tilting of the seatback (14). Since the seat arrangement is changed synchronously with the tilting of the seatback (14), it is possible to reduce the burden of operation on an occupant in changing the seat arrangement, while allowing various seat arrangements.

20 Claims, 16 Drawing Sheets

U.S. PATENT DOCUMENTS

| | | | |
|---|---|---|---|
| 6,520,581 B1 * | 2/2003 | Tame | 297/336 |
| 6,648,392 B2 * | 11/2003 | Fourrey et al. | 296/65.09 |
| 6,729,689 B2 * | 5/2004 | Habedank | 297/335 |
| 6,863,330 B2 * | 3/2005 | Yokoyama et al. | 296/65.03 |
| 6,902,236 B2 * | 6/2005 | Tame | 297/335 |
| 6,916,057 B2 * | 7/2005 | Teich | 296/65.08 |
| 6,983,994 B2 * | 1/2006 | Pino | 297/378.12 |
| 7,090,277 B2 * | 8/2006 | Andrigo et al. | 296/65.08 |
| 7,188,883 B2 * | 3/2007 | Van Dyk et al. | 296/65.01 |
| 7,578,537 B2 * | 8/2009 | Baetz et al. | 296/65.09 |
| 2004/0160104 A1 | 8/2004 | Mukoujima et al. | |
| 2005/0269830 A1 | 12/2005 | Epaud | |
| 2006/0061148 A1 * | 3/2006 | Pollard et al. | 297/85 |
| 2006/0097538 A1 * | 5/2006 | Villeminey | 296/65.09 |
| 2006/0131946 A1 * | 6/2006 | Andrigo et al. | 297/378.1 |
| 2006/0152030 A1 * | 7/2006 | Van Dyk et al. | 296/65.09 |
| 2007/0132266 A1 | 6/2007 | Ghergheli et al. | |
| 2007/0252401 A1 * | 11/2007 | Sumida et al. | 296/37.5 |

FOREIGN PATENT DOCUMENTS

| | | |
|---|---|---|
| DE | 103 55 486 A1 | 7/2004 |
| DE | 203 19 816 U1 | 6/2005 |
| JP | 54-129620 | 10/1979 |
| JP | 63-121143 | 8/1988 |
| JP | 2001-341559 | 12/2001 |
| JP | 2003-291695 | 10/2003 |
| JP | 2004-131075 | 4/2004 |
| JP | 2004-330915 | 11/2004 |
| JP | 2005-67325 | 3/2005 |
| JP | 2005-335697 | 12/2005 |
| JP | 2007-509815 | 4/2007 |

OTHER PUBLICATIONS

Notification of the First Office Action for CN 200780028789.X dated Aug. 10, 2010.

* cited by examiner

VEHICULAR SEAT DEVICE

CROSS-REFERENCE TO RELATED APPLICATIONS

This application is a national phase application of International Application No. PCT/IB2007/002153, filed Jul. 27, 2007, and claims the priority of Japanese Application No. 2006-207625, filed Jul. 31, 2006, the contents of both of which are incorporated herein by reference.

BACKGROUND OF THE INVENTION

1. Field of the Invention

The invention relates to a vehicular seat device.

2. Description of the Related Art

A vehicular seat that includes a front link leg linked to a seat cushion and a support so as to be capable of pivot movements, a rear link leg linked to a seatback and the support so as to be capable of pivot movements, and an intermediate link leg linked to the seatback and the support so as to be capable of pivot movements, wherein a rear portion of the seat cushion attached to the seatback so as to be capable of pivot movements, is disclosed in Japanese Patent Application Publication No. JP-A-2005-335697.

In Japanese Patent Application Publication No. JP-A-2005-335697, the seat has a structure that is changeable to a form in which the seatback is superimposed on the seat cushion, and a form in which the seat cushion is flipped up to reduce the longitudinal width of the seat in order to produce a space for approach to a space behind the seat. However, when the seat is to be changed to the form in which the longitudinal width of the seat is reduced, it is necessary to perform an operation of once raising the seat upward relative to the vehicle. Therefore, it is considered that a burden on a person in changing the seat form will increase.

SUMMARY OF THE INVENTION

It is an object of the invention to reduce the burden of operation on an occupant in changing the seat arrangement, while allowing various seat arrangements.

A vehicular seat device in accordance with a first aspect of the invention includes a seat cushion, a seatback which is provided on a base member via a reclining mechanism and whose inclination angle is adjustable, and cooperation means for changing a posture of the seat cushion synchronously with tilting of the seatback. As seat arrangements, the vehicular seat device assumes an entry/exit state in which the seatback is tilted forward and the seat cushion is in a standing state, a retracted state in which the seat cushion is moved forward downward relative to a vehicle and the seat cushion is superimposed on an upper side of the seatback, a seating state in which the seatback is not tilted forward, and the seat cushion is not moved forward downward relative to the vehicle or the seat cushion is not in the standing state, and the seat arrangement is changed via the cooperation means.

According to the vehicular seat device of the first aspect, the seat arrangement can be changed synchronously with the tilting of the seatback. Therefore, it is possible to reduce the burden of operation on an occupant in changing the seat arrangement, while allowing various seat arrangements.

According to the vehicular seat device of the first aspect, the cooperation means may include: a first linking member whose first end is pivotably linked to a vehicle floor member, and whose second end is pivotably linked to a seat cushion frame of the seat cushion; a second linking member whose first end is pivotably linked to a position on the seat cushion frame which is rearward, relative to the vehicle, of a linking position of the first linking member, and whose second end is pivotably linked to a seatback frame of the seatback; and a drive mechanism that causes the second linking member to be drivable rotationally about the second end of the second linking member and changes the posture of the seat cushion via the second linking member synchronously with the tilting of the seatback when the seat arrangement is changed between the seating state and the entry/exit state.

In the foregoing aspect, the vehicular seat device may further include a lock member pivotably provided on the seat cushion frame. The lock member may be urged in such a direction as to engage with the first end of the second linking member, and the lock member may be engaged with the first end of the second linking member when the seat arrangement is the seating state or the retracted state.

According to this construction, the posture of the seat cushion can be smoothly changed by a simple operation of the second end synchronously with the tilting of the seatback. Therefore, it is possible to provide a comfortable cabin space with various selectable seat arrangements while reducing the burden of operation on an occupant.

In the vehicular seat device described above, the cooperation means may further include a third linking member whose first end is pivotably linked to the vehicle floor member, and whose second end is pivotably and detachably linked to an engagement portion provided on the second linking member. When the seat arrangement is changed from the seating state to the entry/exit state, the second end may be kept linked to the engagement portion, and when the seat arrangement is changed from the seating state to the retracted state, the second end may be disengaged from the engagement portion. When the seat arrangement is changed from the seating state to the entry/exit state, the posture of the seat cushion may be changed by causing the second linking member to rotate due to a difference between a locus of the second end of the third linking member and a locus of the second end of the second linking member that are involved in the tilting of the seatback.

According to the foregoing construction, the third linking member is provided as cooperation means in addition to the first linking member and the second linking member. When the seat arrangement is changed from the seating state to the entry/exit state, the second end of the third linking member is kept linked to the engagement portion of the second linking member. As the seatback is tilted, the second end of the second linking member undergoes circular motion about the center of tilt of the seatback, and the second end of the third linking member undergoes circular motion about the first end of the third linking member. If a single link is assumed to extend from the second end of the third linking member to the second end of the second linking member, the posture of the link changes due to the difference between the loci of the two second ends. Due to the posture change of the link, the second linking member is caused to rotate, so that the posture of the seat cushion can be changed. Therefore, the posture of the seat cushion can be smoothly changed synchronously with the tilting of the seatback.

In the foregoing construction, the first end of the third linking member may be pivotably linked to a support bracket as the vehicle floor member.

In the foregoing construction, the second linking member may have an extension portion in the second end, and the engagement portion may be provided in the extension portion.

In the vehicular seat device constructed as described above, the cooperation means may include: a first linking member whose first end is pivotably linked to a vehicle floor member; a second linking member whose first end is fixed to the seat cushion frame and whose second end is pivotably linked to a seatback frame of the seatback; a third linking member whose first end is pivotably linked to a second end of the first linking member, and whose second end is pivotably linked to the seatback frame, and which, together with the first linking member, supports the seat cushion when the seat arrangement is the seating state, and a drive mechanism that is constructed so as to be able to drive the second linking member rotationally about the second end of the second linking member synchronously with the tilting of the seatback, and that changes the posture of the seat cushion via the second linking member.

In this vehicular seat device, the cooperation means includes the first linking member, the second linking member, the third linking member and the drive mechanism. When the seat arrangement is the seating state, the seat cushion is supported by the first and third linking members.

When the seat arrangement is changed between the seating state and the entry/exit state, the second linking member is driven rotationally about the second end of the second linking member by the drive mechanism synchronously with the tilting of the seatback. Therefore, the posture of the seat cushion can be smoothly changed by a simple operation synchronously with the tilting of the seatback. Therefore, it is possible to provide a comfortable cabin space with various selectable seat arrangements while reducing the burden of operation on an occupant.

In the vehicular seat device constructed as described above, the cooperation means may further include a fourth linking member whose first end is pivotably linked to a position on the second linking member remote from the second end of the second linking member, and whose second end is pivotably and detachably linked to an engagement portion that is provided on the base member, and wherein when the seat arrangement is changed from the seating state to the entry/exit state, the second end is kept linked to the engagement portion, and when the seat arrangement is changed from the seating state to the retracted state, the second end is disengaged from the engagement portion. When the seat arrangement is changed from the seating state to the entry/exit state, the posture of the seat cushion may be changed by causing the second linking member to rotate due to a difference between a locus of the first end of the fourth linking member and a locus of the second end of the second linking member that are involved in the tilting of the seatback.

According to this construction, the fourth linking member is provided as cooperation means, in addition to the first linking member, the second linking member and the third linking member. When the seat arrangement is changed from the seating state to the entry/exit state, the second end of the fourth linking member is kept linked to the engagement portion. As the seatback is tilted, the second end of the second linking member undergoes circular motion about the center of tilt of the seatback, and the first end of the fourth linking member undergoes circular motion about the second end of the fourth linking member. If a single link is assumed to extend from the first end of the fourth linking member to the second end of the second linking member, the posture of the link changes due to the difference between the loci of the first end of the fourth linking member and the second end of the second linking member. Due to the posture change of the link, the second linking member is caused to rotate, so that the posture of the seat cushion can be changed. Therefore, the posture of the seat cushion can be smoothly changed synchronously with the tilting of the seatback.

In the foregoing construction, the second linking member may have an extension portion on the second end, and the first end of the fourth linking member may be pivotably linked to a distal end of the extension portion. Furthermore, the third linking member may have a boomerang shape.

In the vehicular seat device constructed as described above, the drive mechanism may include: a first force transmission member that is provided coaxially with a center of tilt of the seatback in the reclining mechanism, and that is restricted in pivoting when the seat arrangement is changed between the seating state and the entry/exit state; and a second force transmission member that is provided on the second end of the second linking member, and that is rotationally driven by the first force transmission member so as to change the posture of the seat cushion synchronously with the tiling of the seatback when the seat arrangement is changed between the seating state and the entry/exit state.

According to the foregoing construction, the drive mechanism includes the first force transmission member provided on the center of tilt of the seatback, and the second force transmission member provided on the second end of the second linking member. When the seat arrangement is changed between the seating state and the entry/exit state, the pivoting of the first force transmission member is restricted, and the second force transmission member is rotationally driven by the first force transmission member synchronously with the tilting of the seatback. Then, as the second force transmission member rotates, the second linking member pivots about the second end of the second linking member, and therefore the posture of the seat cushion changes. Therefore, the posture of the seat cushion can be further smoothly changed synchronously with the tilting of the seatback, so that the operational feeling for an occupant can be improved.

In the vehicular seat device constructed as described above, the first force transmission member may pivot when the seat arrangement is changed between the seating state and the retracted state.

According to this construction, the first force transmission member does not impede the circular motion of the second force transmission member about the center of tilt of the seatback which is involved with the seatback. Therefore, the changing of the seat arrangement between the seating state and the retracted state can be smoothly performed.

In the foregoing construction, the first force transmission member and the second force transmission member may be gears. Furthermore, the first force transmission member and the second force transmission member may also be friction wheels, or may also be a combination of a pulley and a force transmission member wrapped around the pulley.

In the foregoing construction, the vehicular seat device may further include an idle gear that is provided between the first force transmission member and the second force transmission member and that meshes with the first force transmission member and with the second force transmission member.

In the foregoing construction, the vehicular seat device may further include a lock pin that is provided on the base member and that is engaged with and disengaged from a cutout that is formed in the first force transmission member. The lock pin may be engaged with the cutout when the seat arrangement is the entry/exit state, and the lock pin may be disengaged from the cutout when the seat arrangement is changed to the retracted state.

In the vehicular seat device constructed as described above, the base member may be adjustable in a longitudinal position relative to the vehicle by a longitudinal position adjustment mechanism.

According to this construction, when the seat arrangement is set to the entry/exit state, the seat cushion and the seatback are moved to a position forward relative to the vehicle. Thus, an increased entry/exit space for a rearseat of the vehicle can be secured.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
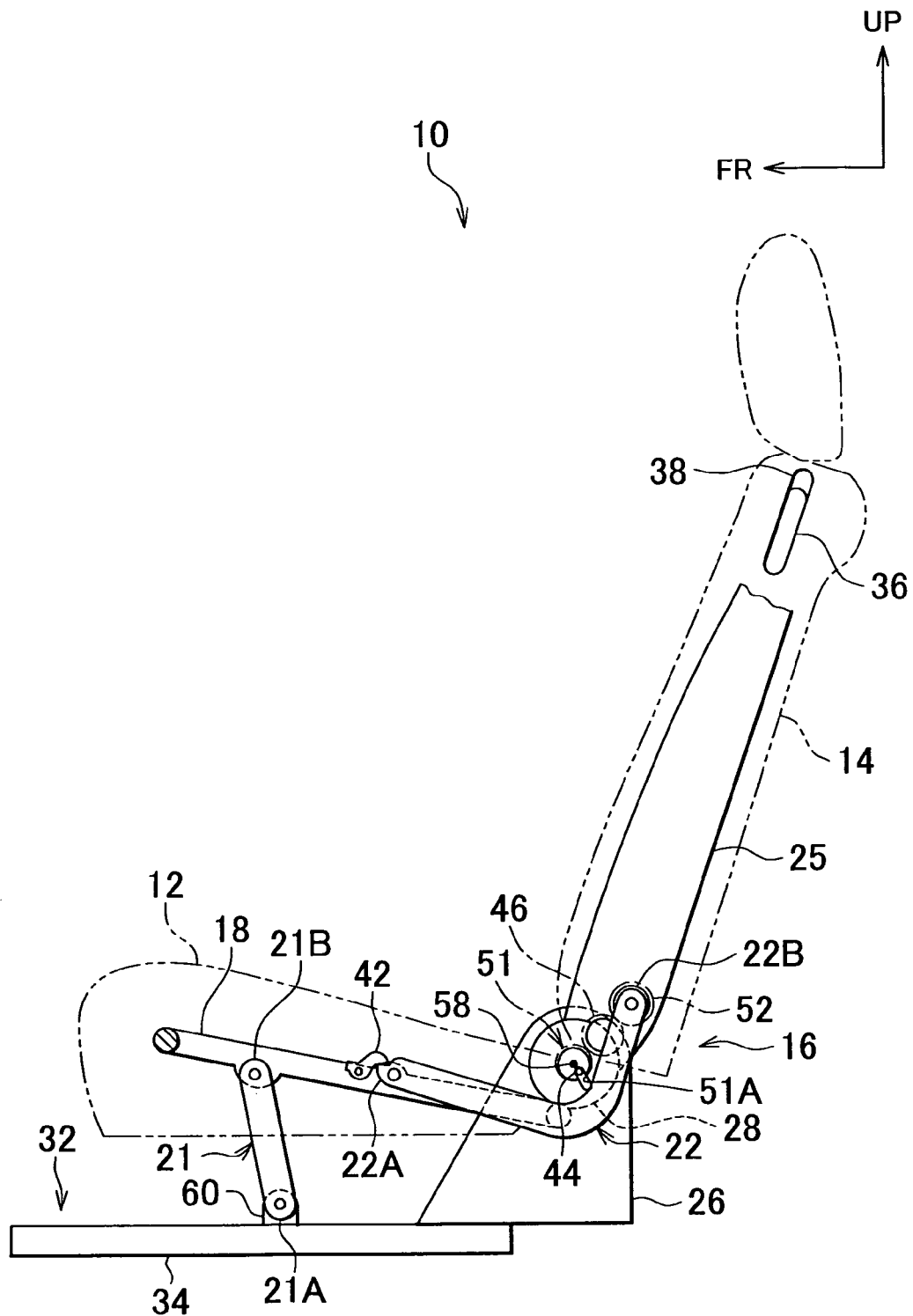
FIG. 1 is a side view showing a vehicular seat device in accordance with a first embodiment of the invention when the seat arrangement is a seating state.

Embodiments of the invention will be described hereinafter with reference to the drawings.

In FIGS. 1 to 7, a vehicular seat device 10 in accordance with a first embodiment of the invention has a seat cushion 12, a seatback 14, a first linking member 21 and a second linking member 22 as cooperation means, and a drive mechanism 16. As seat arrangements, the vehicular seat device 10 assumes a seating state shown in FIGS. 1 and 5 in which the seatback is not tilted forward, and the seat cushion is not moved forward downward relative to the vehicle or the seat cushion is not in the standing state, and in which an occupant (not shown) can sit, an entry/exit state shown in FIGS. 3 and 6 in which the seatback 14 is tilted forward and the seat cushion 12 is put in a standing state, and a retracted state shown in FIGS. 4 and 7 in which the seat cushion 12 is moved forward downward and the seatback 14 is superimposed on an upper side of the seat cushion 12.

The seat cushion 12 is constructed so that an occupant can sit on the seat cushion 12, and has a seat cushion frame 18. The seat cushion frame 18 is, for example, a generally square frame-like body, and is provided with, for example, a net-like spring (not shown). The seat cushion frame 18 is covered with a cushion material (not shown) that has been formed into a predetermined shape, and in turn, the cushion material is covered with a seat shell (not shown).

The seatback 14 is constructed as a backrest for an occupant, and is provided on a base member 26 via a reclining mechanism 28 so that the inclination angle thereof can be adjusted. Concretely, the seatback 14 has a seatback frame 25. A lower end of the seatback frame 25 is linked to the reclining mechanism 28. The seatback frame 25 is covered with a cushion material (not shown) that has been formed into a predetermined shape, and in turn, the cushion material is covered with a seat shell (not shown).

The base member 26 is disposed so that the position thereof in the longitudinal direction relative to the vehicle can be adjusted by a longitudinal position adjustment mechanism 32. The longitudinal position adjustment mechanism 32 is, for example, constructed so that an upper rail (not shown) is slidable in the longitudinal direction relative to the vehicle on a lower rail 34 that is fixed to a vehicle floor panel (not shown). The base member 26 is mounted on the upper rail.

Figure 2:
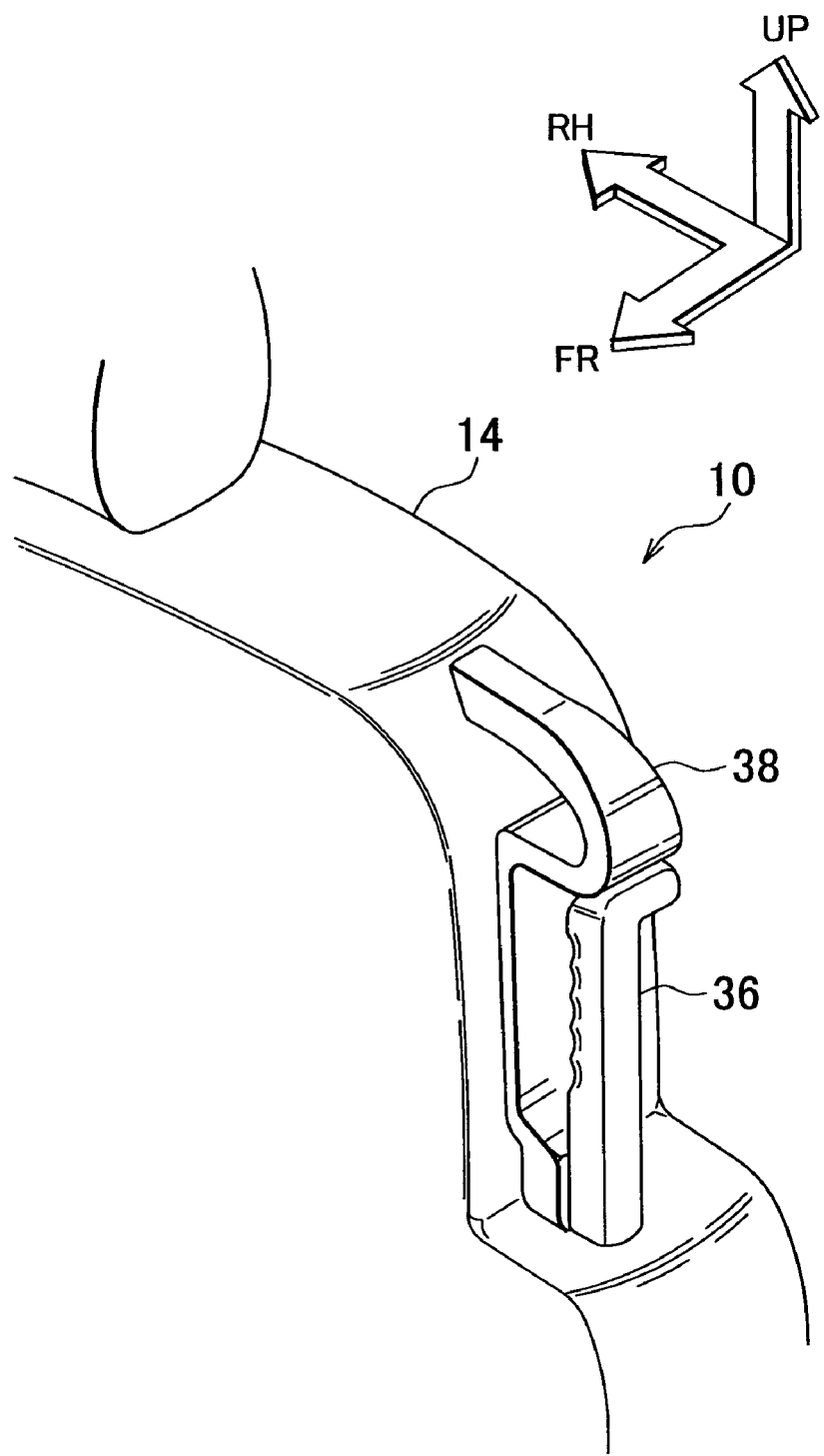
FIG. 2 is an enlarged perspective view showing an operating lever that is provided on a seatback in the first embodiment of the invention.

In FIG. 2, the seatback 14 has, for example, on a side surface thereof, operating levers 36, 38 that are operated when the seat arrangement is to be changed are provided. The operating lever 36 is used when the seat arrangement is to be changed between the seating state and the retracted state, while the operating lever 38 is used when the seat arrangement is to be changed between the seating state and the entry/exit state.

Figure 5:
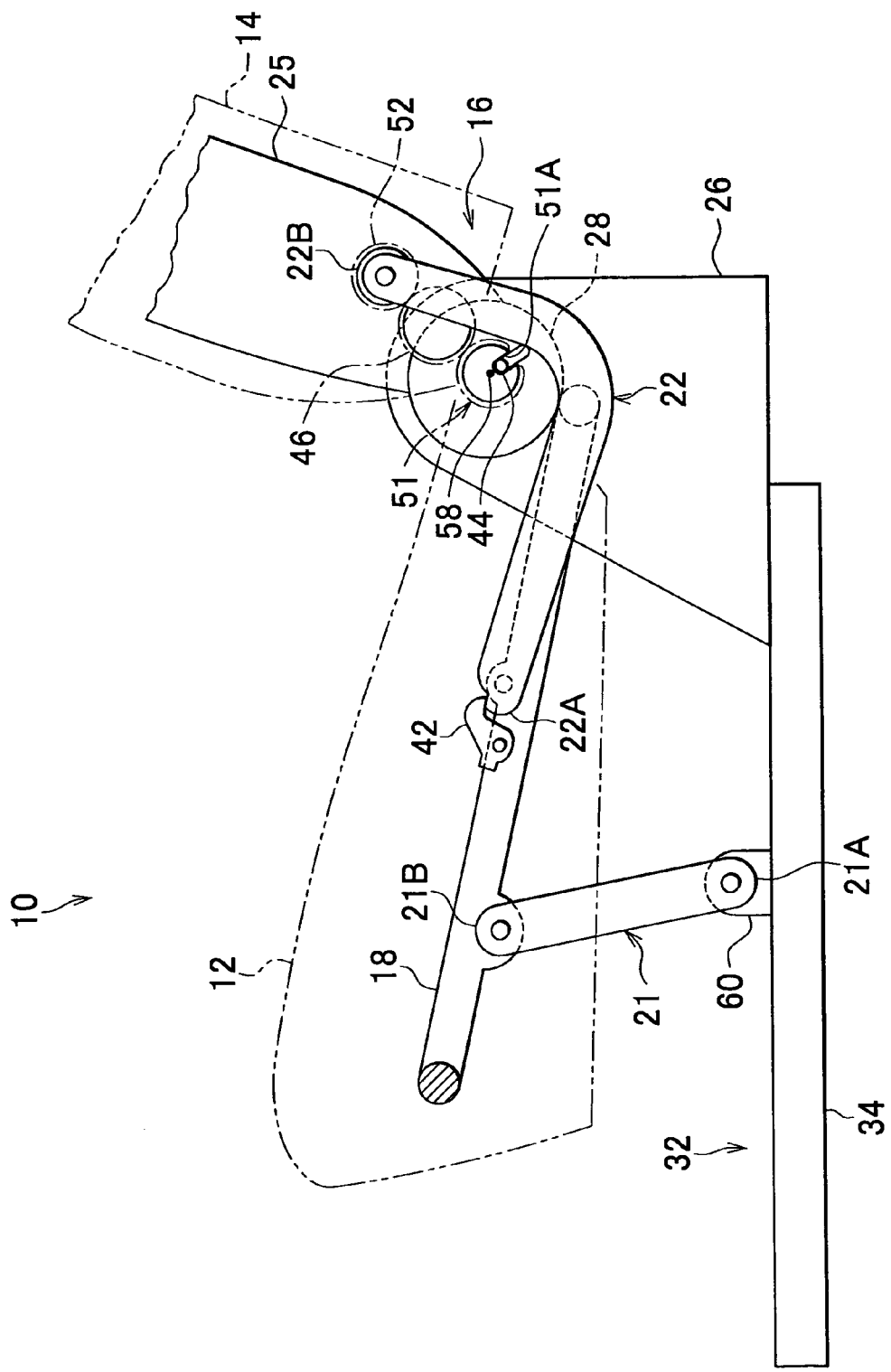
FIG. 5 is an enlarged side view showing the vehicular seat device in the first embodiment of the invention when the seat arrangement is the seating state.

In FIGS. 1 and 5, the first linking member 21 is, for example, a lineally shaped link. A first end 21A of the first linking member 21 is pivotably linked to a vehicle floor member, for example, a mount bracket 60 provided on the upper rail of the longitudinal position adjustment mechanism 32. A second end 21B thereof is pivotably linked to a portion of the seat cushion frame 18 of the seat cushion 12 which is forward of a linking portion of the seat cushion frame 18 to a first end 22A of a second linking member 22 described later.

The second linking member 22 is, for example, a boomerang-shaped link. A first end 22A thereof is pivotably linked to the seat cushion frame 18, at a position that is rearward relative to the vehicle of the linking position to the first linking member 21. A second end 22B thereof is pivotably linked to the seatback frame 25 of the seatback 14. The first end 22A of the second linking member 22 is pivotably linked to, for example, a middle portion of the seat cushion frame 18, and is constructed so that, when the seat arrangement is the seating state or the retracted state, a lock member 42 engages with the first end 22A. The second end 22B of the second linking member 22 is pivotably linked to, for example, a lower portion of the seatback frame 25.

In FIGS. 1 and 5, the lock member 42 is urged by urging means (not shown) in such a direction as to engage with the first end 22A of the second linking member 22, and is linked to the operating lever 38 by a cable (not shown). The locked state of the second linking member 22 held by the lock member 42 can be released against the springy force of the urging means by operating the operating lever 38.

The drive mechanism 16 is capable of rotationally driving the second linking member 22 about the second end 22B of the second linking member 22 synchronously with the tilting of the seatback 14 when the seat arrangement is changed between the seating state and the entry/exit state. That is, the drive mechanism 16 is able to change the posture of the seat cushion 12 via the second linking member 22. Concretely, the vehicular seat device 10 has, as the drive mechanism 16, a first gear 51 that is an example of a first force transmission member, and a second gear 52 that is an example of a second force transmission member.

In FIGS. 1 and 5, the first gear 51 is provided coaxially with a center of tilt 58 of the seatback 14 in the reclining mechanism 28, and the pivoting of the first gear 51 is restricted when the seat arrangement is changed between the seating state and the entry/exit state. Concretely, in FIG. 5, the first gear 51 has, for example, at a site therein, a cutout 51A. The base member 26 is provided with a lock pin 44 that can be placed in and out of the cutout 51A. The lock pin 44 is urged in such a direction as to engage with the cutout 51A by urging means such as a spring or the like (not shown). The lock pin 44 is linked to the operating lever 36 (FIG. 2) via a cable (not shown).

Figure 3:
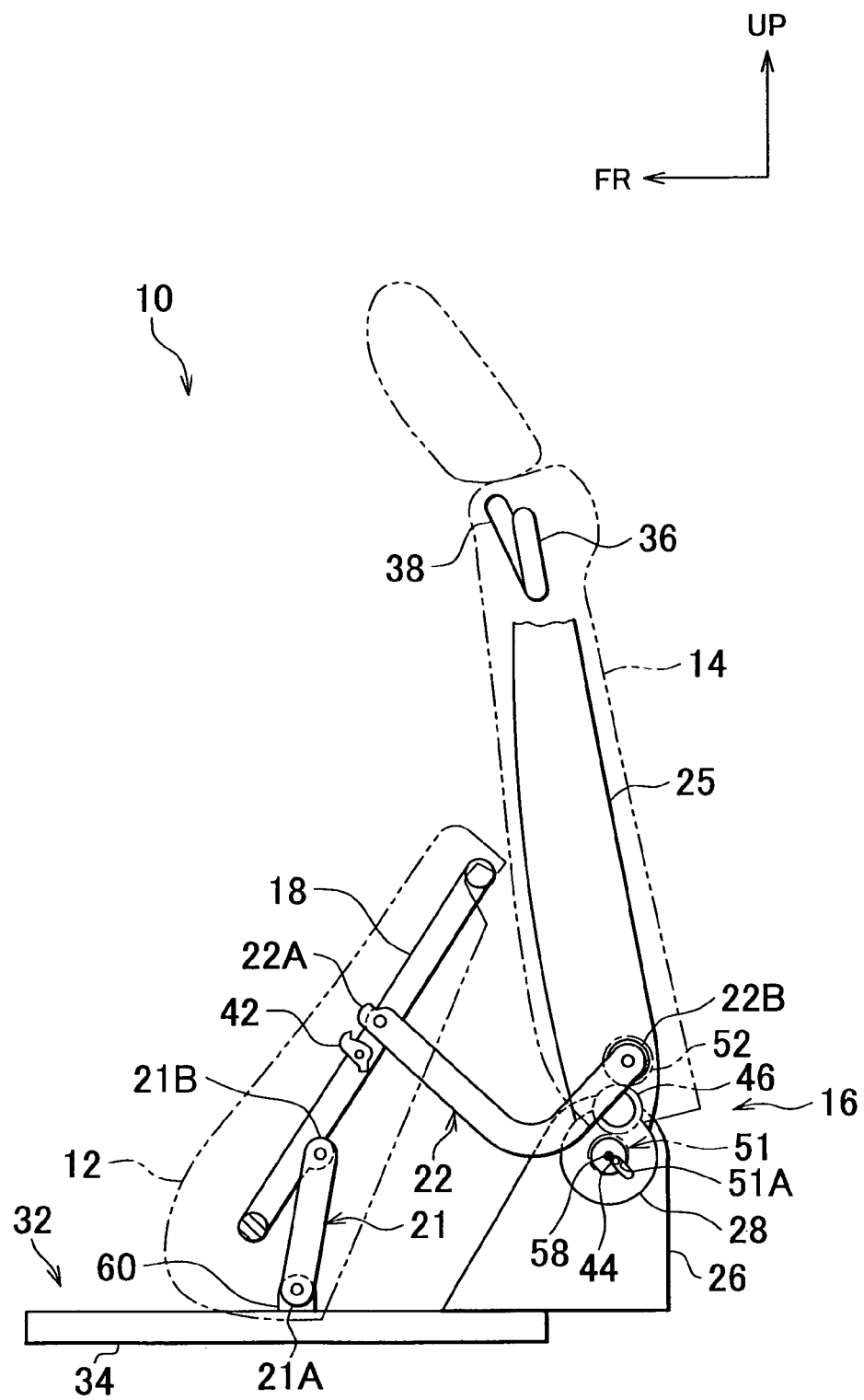
FIG. 3 is a side view showing the vehicular seat device in the first embodiment of the invention when the seat arrangement is an entry/exit state.
Figure 6:
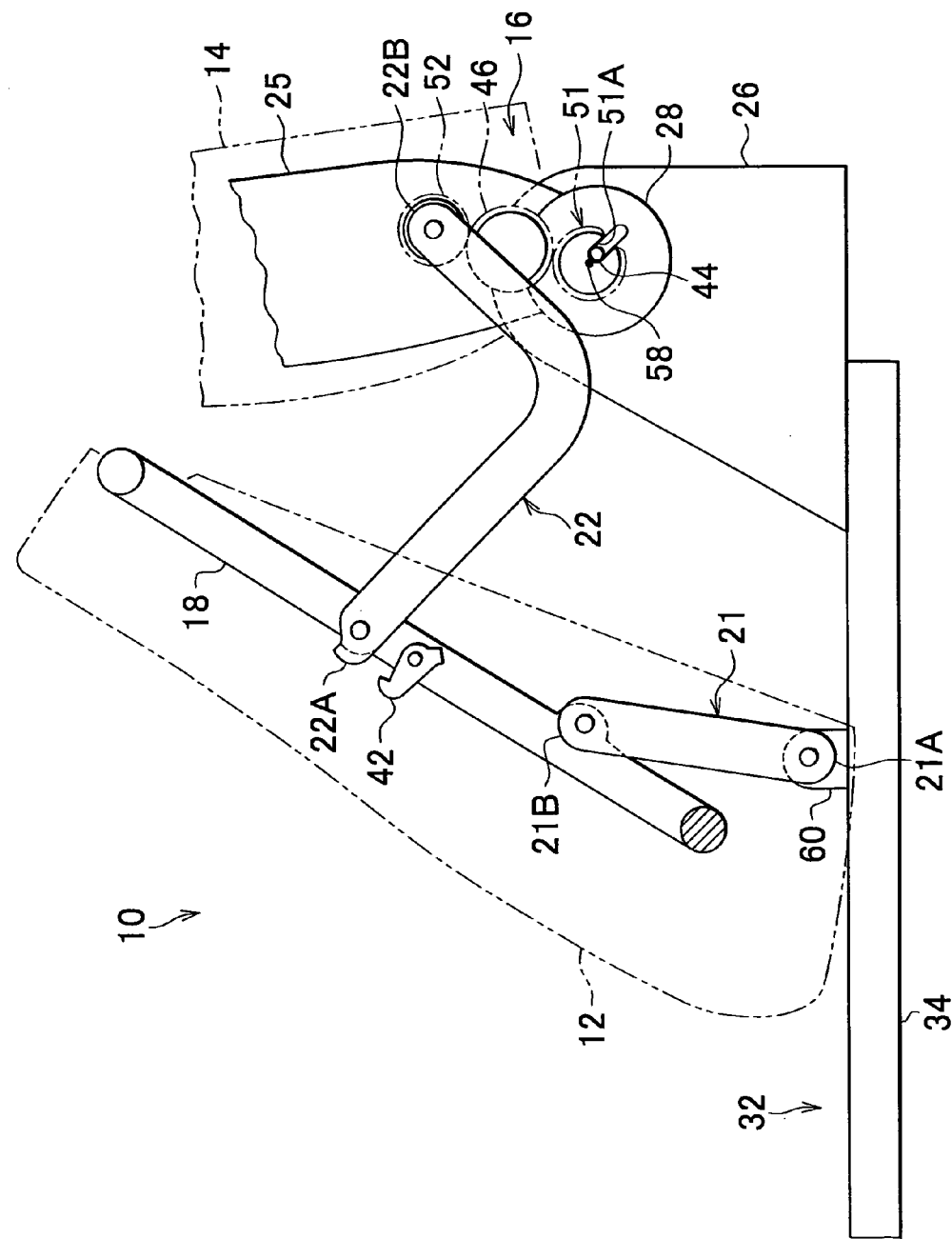
FIG. 6 is an enlarged side view showing the vehicular seat device in the first embodiment of the invention when the seat arrangement is the entry/exit state.

The lock pin 44 is able to restrict the pivoting of the first gear 51 by engaging with the cutout 51A of the first gear 51 when the seat arrangement is the seating state shown in FIGS. 1 and 5, and when the seat arrangement is the entry/exit state shown in FIGS. 3 and 6. Furthermore, when the seat arrangement is to be changed between the seating state and the retracted state, the restriction of the pivoting of the first gear 51 can be released by operating the operating lever 36 to disengage the lock pin 44 from the cutout 51A.

As shown in FIGS. 1 and 3, and FIGS. 4 to 7, the second gear 52 is provided on the second end 22B of the second linking member 22. The second gear 52 is rotationally driven by the first gear 51 to change the posture of the seat cushion 12 synchronously with the tilt of the seatback 14 when the seat is changed between the seating state and the entry/exit state.

Concretely, the second gear 52 is fixed coaxially with the second end 22B journaled to the seatback frame 25. By rotationally driving the second gear 52, the second linking member 22 can be rotated relative to the seatback 14. The gear ratio between the first gear 51 and the second gear 52 is determined by factoring in the amount of tilt of the seatback 14 and the amount of change in the posture of the seat cushion 12.

In this embodiment, taking into account the direction of pivoting of the second linking member 22 at the time of tilting the seatback 14, an idle gear 46 is provided between the first gear 51 and the second gear 52. The idle gear 46 is freely pivotably provided, for example, on the seatback frame 25, and is meshed with the first gear 51 and with the second gear 52. Specifically, when the seatback 14 is tilted, the idle gear 46 revolves around the first gear 51 while meshing with the first gear 51, so that the second gear 52 is rotationally driven.

Incidentally, the restriction of the pivoting of the first gear 51 is not limited to the complete stop of the pivoting of the first gear 51 by the lock pin 44, but may also be accomplished by a construction that allows the first gear 51 to slightly pivot as long as the construction is able to change the posture of the seat cushion 12 synchronously with the tilt of the seatback 14.

The reclining mechanism 28 has a stopper mechanism (not shown) that restricts the tilting action of the seatback 14. By the stopper mechanism, the seatback 14 can be kept from further tilting down when the seatback 14 has been tilted forward relative to the vehicle to a predetermined inclination angle during the changing of the seat arrangement from the seating state to the entry/exit state. Furthermore, when the seat arrangement is changed from the seating state to the retracted state, the restriction of the tilt of the seatback 14 up to the predetermined inclination angle by the stopper mechanism is released, so that the seatback 14 can be tilted forward to a position where the seatback 14 overlaps with the seat cushion 12.

The embodiment is constructed as described above, and the operation thereof will be described below. In FIG. 1, when the seat arrangement of the vehicular seat device 10 is in the seating state, the lock member 42 is engaged with the first end 22A of the second linking member 22, thus forming a locked state. Furthermore, the lock pin 44 engaged with the cutout 51A of the first gear 51 restricts the pivoting of the first gear 51. A rear portion of the seat cushion frame 18 is supported, for example, by a support portion (not shown) provided on the base member 26, whereby the seat cushion 12 and the seatback 14 are held in the seating state in which, for example, they are each inclined rearward to an appropriate degree. When the seat arrangement is the seating state, the longitudinal position of the vehicular seat device 10 can be adjusted by sliding the upper rail on the lower rail 34.

Next, the operation performed when the seat arrangement is changed from the seating state to the entry/exit state will be described. Referring to FIG. 1, when a predetermined operation with the operating lever 38 is performed, the cable (not shown) is drawn to disengage the lock member 42 from the first end 22A of the second linking member 22, so that the locked state is released, and at the same time the locked state of the seatback 14 held by the reclining mechanism 28 is released. Thus, the seatback 14 becomes able to be tilted. The pivoting of the first gear 51 is restricted by the lock pin 44.

Then, when the seatback 14 is tilted forward, the idle gear 46 and the second gear 52 revolve around the first gear 51, whose pivoting is restricted. Therefore, due to the mesh of the idle gear 46 with the first gear 51, the idle gear 46 rotates counterclockwise in the plane of the sheet of the drawing. As the idle gear 46 rotates, the second gear 52 meshing with the idle gear 46 rotates clockwise in the plane of the sheet of the drawing.

Since the second gear 52 is rotationally driven by the first gear 51 in this manner, the second linking member 22 pivots clockwise in the plane of the drawing sheet about the second end 22B, that is, the posture of the seat cushion 12 changes so that a front portion thereof is raised upward relative to the vehicle. Then, when the seatback 14 is tilted forward to a predetermined inclination angle as shown in FIGS. 3 and 6, the seatback 14 is held by the stopper mechanism of the reclining mechanism 28 so as not to further tilt down while the seat cushion 12 is held in a standing state. Thus, the seat arrangement becomes the entry/exit state.

When the vehicular seat device 10 is in the entry/exit state, the entry/exit space for a rearseat (not shown) of the vehicle is larger than when in the seating state. Therefore, the ease of entry/exit for the rearseat of the vehicle improves. If the seat cushion 12 and the seatback 14 are slid forward relative to the vehicle through the use of the longitudinal position adjustment mechanism 32, an increased entry/exit space for the rearseat of the vehicle can be secured.

To return the seat arrangement from the entry/exit state to the seating state, the seatback 14 is drawn rearward relative to the vehicle, so that the idle gear 46 and the second gear 52 revolve around the first gear 51, which is restricted in pivoting. Due to the meshing of the idle gear 46 with the first gear 51, the idle gear 46 rotates clockwise in the plane of the drawing sheet. As the idle gear 46 rotates, the second gear 52, meshing with the idle gear 46, rotates counterclockwise in the plane of the drawing sheet.

As the second gear 52 is rotationally driven by the first gear 51 in this manner, the second linking member 22 pivots counterclockwise in the plane of the drawing sheet about the second end 22B. Thus, the posture of the seat cushion 12 changes so that the front portion of the second linking member descends. Then, when the seatback 14 returns to a predetermined inclination angle as shown in FIGS. 1 and 5, the seatback 14 is locked by the reclining mechanism 28, and the first end 22A of the second linking member 22 is locked by the lock member 42. In this manner, the seat arrangement returns to the seating state.

Next, the operation performed when the seat arrangement is changed from the seating state to the retracted state will be described. In FIGS. 1 and 5, when a predetermined operation with the operating lever 36 is performed, the cable (not shown) is drawn to release the locked state of the seatback 14 held by the reclining mechanism 28, so that the seatback 14 becomes able to be tilted. Furthermore, the lock pin 44 is disengaged from the cutout 51A of the first gear 51, so that the first gear 51 becomes freely pivotable relative to the base member 26. At this time, the locked state of the first end 22A of the second linking member 22 held by the lock member 42 is maintained, so that the second linking member 22 cannot be rotated relative to the seat cushion frame 18.

Then, when the seatback 14 is tilted forward relative to the vehicle, the first linking member 21 pivots forward relative to the vehicle about the first end 21A, and furthermore, as the second linking member 22 moves forward downward relative to the vehicle, the seat cushion 12 is moved forward downward relative to the vehicle. At this time, as the second gear 52 moves, the idle gear 46 rotates counterclockwise in the plane of the drawing sheet and the first gear 51 rotates clockwise in the plane of the drawing sheet. Since the first gear 51 is freely rotatable, the locked state of the second linking member 22 relative to the seat cushion frame 18 does not impede the revolution of the second gear 52 about the center of tilt 58 of the seatback 14, so that the seatback 14 can be tilted easily.

Figure 4:
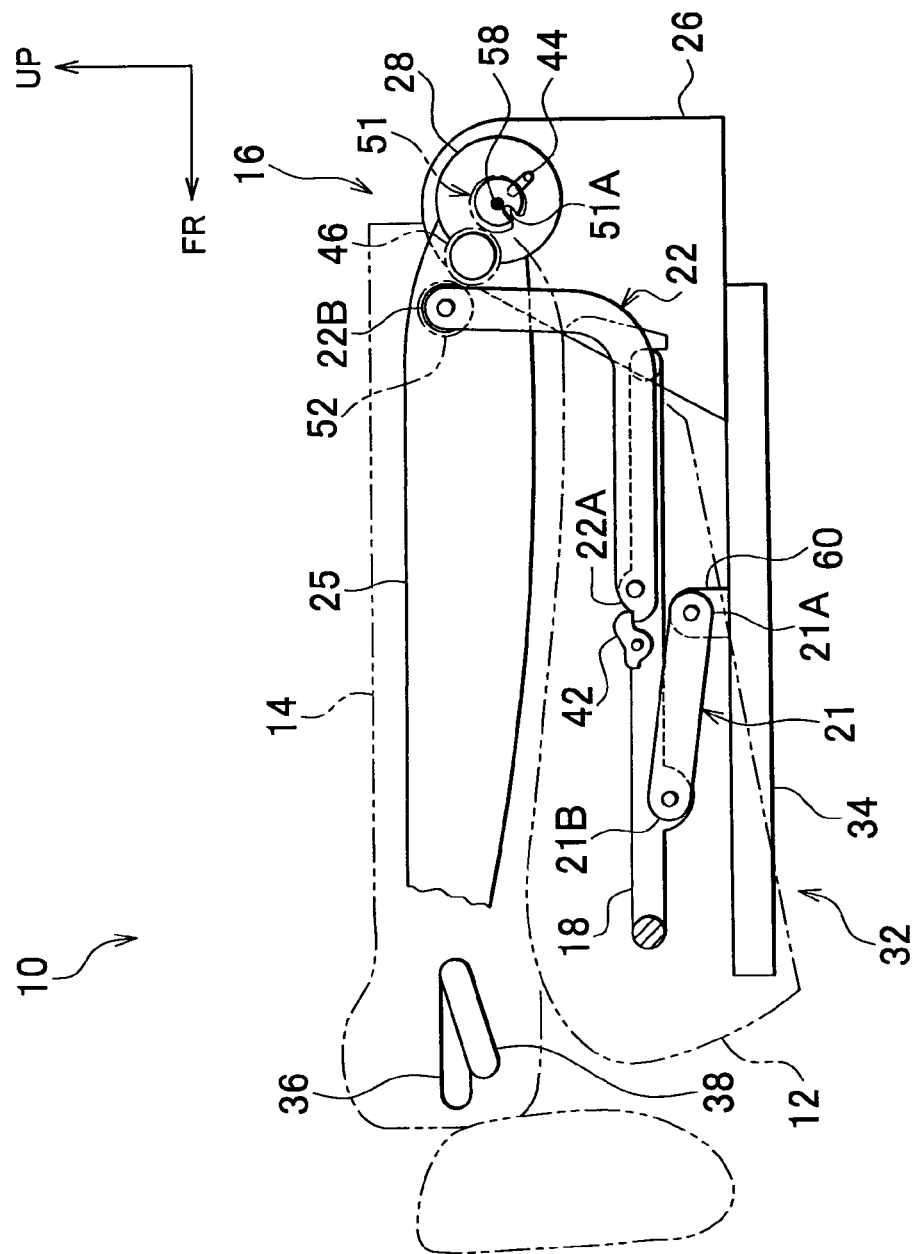
FIG. 4 is a side view showing the vehicular seat device in the first embodiment of the invention when the seat arrangement is a retracted state.
Figure 7:
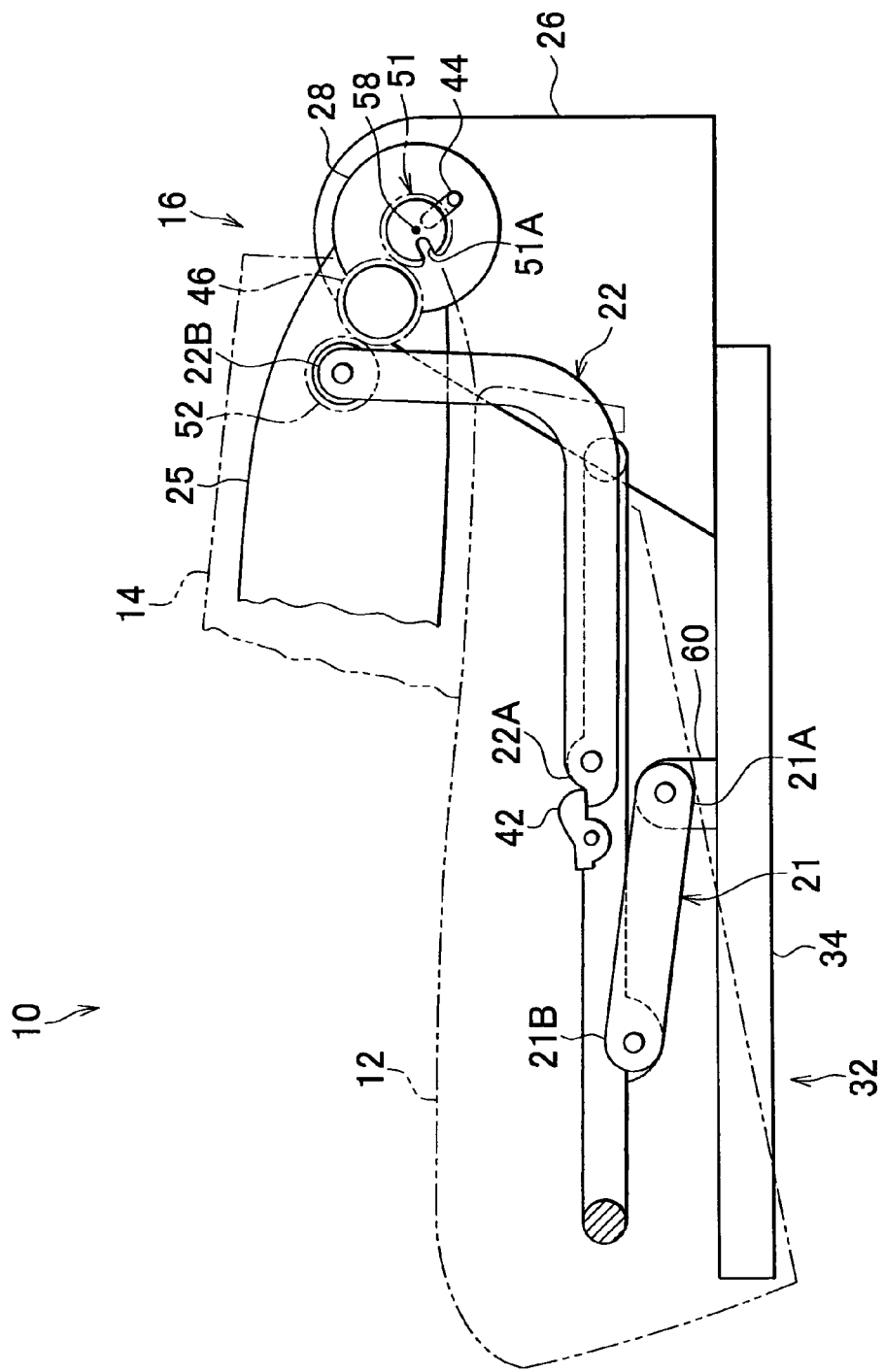
FIG. 7 is an enlarged side view showing the vehicular seat device in the first embodiment of the invention when the seat arrangement is the retracted state.

Then, as shown in FIGS. 4 and 7, the seat cushion 12 moves forward downward relative to the vehicle, and the seatback 14 is superimposed on the upper side of the seat cushion 12. Thus, the seat arrangement becomes the retracted state. In the retracted state, since the seatback 14 is tilted down, the space above the vehicular seat device 10 can be utilized as a cargo space.

To return the seat arrangement from the retracted state to the seating state, the seatback 14 is pulled up rearward relative to the vehicle, so that the seat cushion 12 moves rearward and upward relative to the vehicle in accordance with the movements of the first linking member 21 and the second linking member 22. At this time, as the second gear 52 moves, the idle gear 46 rotates clockwise in the plane of the drawing sheet and the first gear 51 rotates counterclockwise in the plane of the drawing sheet. Since the first gear 51 is freely rotatable, the locked state of the second linking member 22 relative to the seat cushion frame 18 does not impede the revolution of the second gear 52 about the center of tilt 58 of the seatback 14, so that the seatback 14 can be tilted in the pull-up direction.

Then, when the seatback 14 returns to the predetermined angle as shown in FIGS. 1 and 5, the seatback 14 is locked by the reclining mechanism 28. Furthermore, as the position of the cutout 51A of the first gear 51 reaches the position of the lock pin 44, the lock pin 44 enters the cutout 51A, so that the first gear 51 is locked by the lock pin 44. In this manner, the seat arrangement returns to the seating state.

As described above, since the change of the seat arrangement is synchronized with the tilting of the seatback 14, the vehicular seat device 10 is cable of reducing the burden of operation on an occupant in changing the seat arrangement, while allowing various seat arrangements. In particular, since the vehicular seat device 10 employs the first gear 51 and the second gear 52 as the drive mechanism 16, the posture of the seat cushion 12 can be smoothly changed synchronously with the tilting of the seatback 14, so that the operational feeling for an occupant can be improved.

Figure 8:
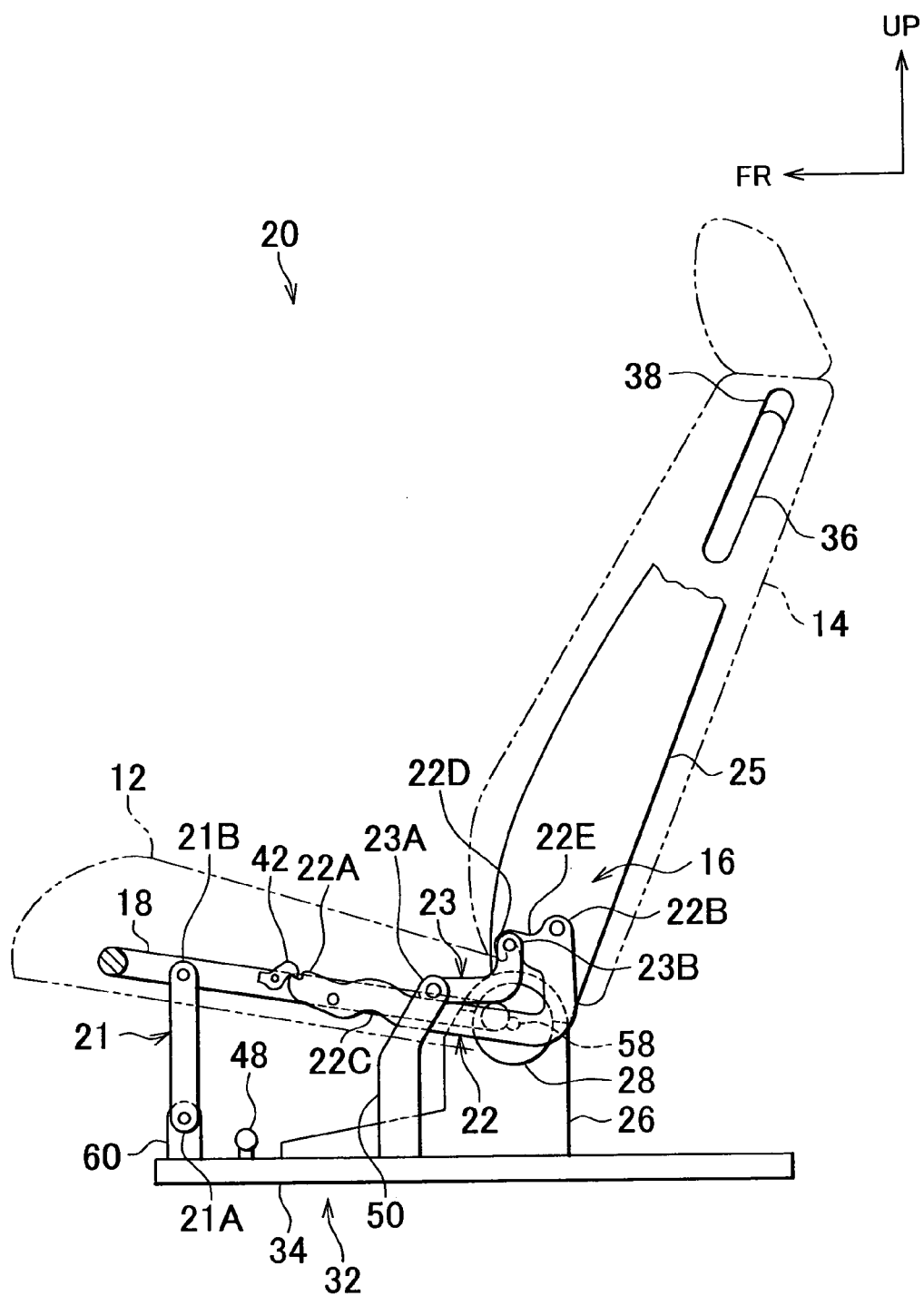
FIG. 8 is a side view showing a vehicular seat device in accordance with a second embodiment of the invention when the seat arrangement is a seating state.
Figure 9:
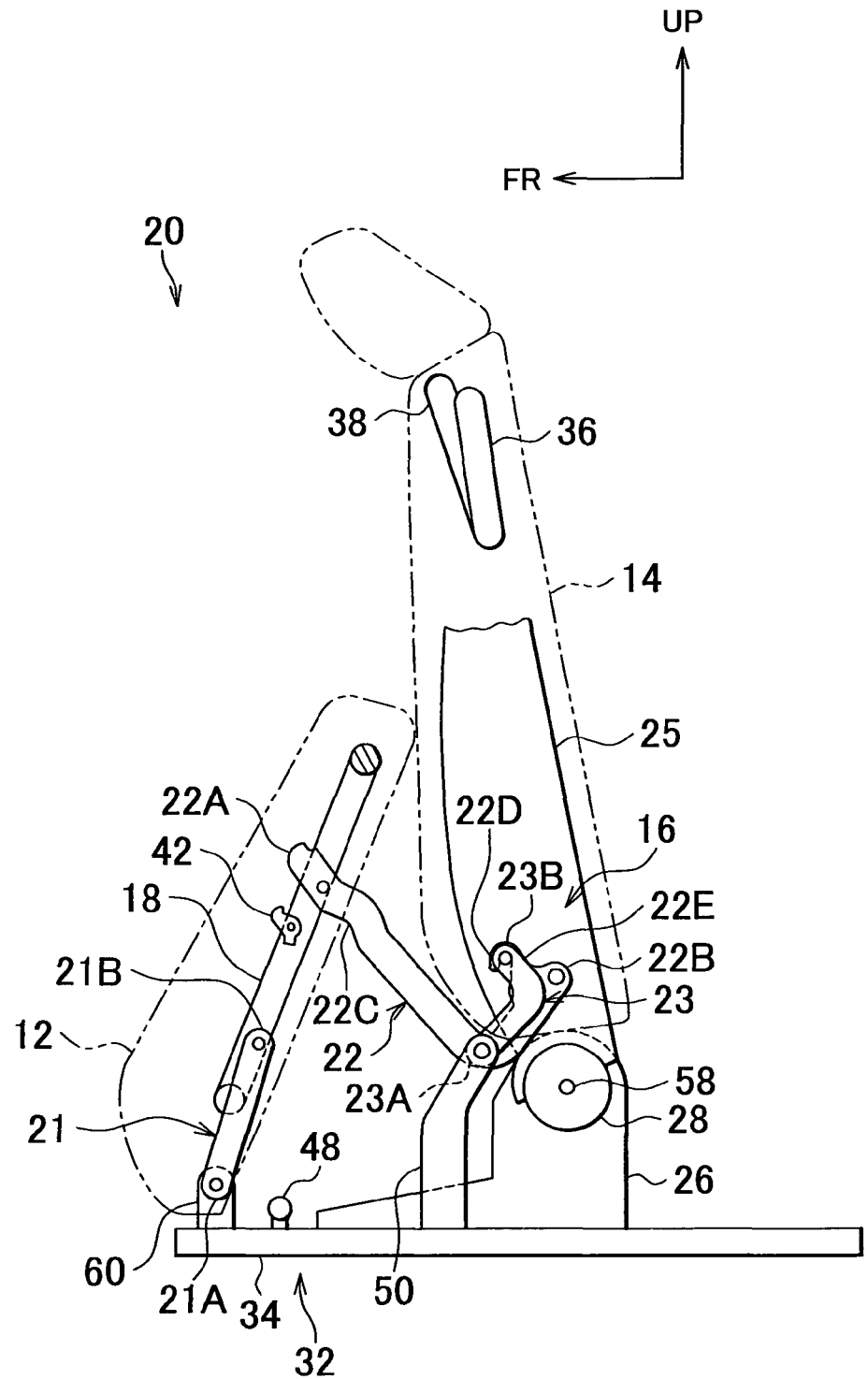
FIG. 9 is a side view showing the vehicular seat device in the second embodiment of the invention when the seat arrangement is an entry/exit state.
Figure 10:
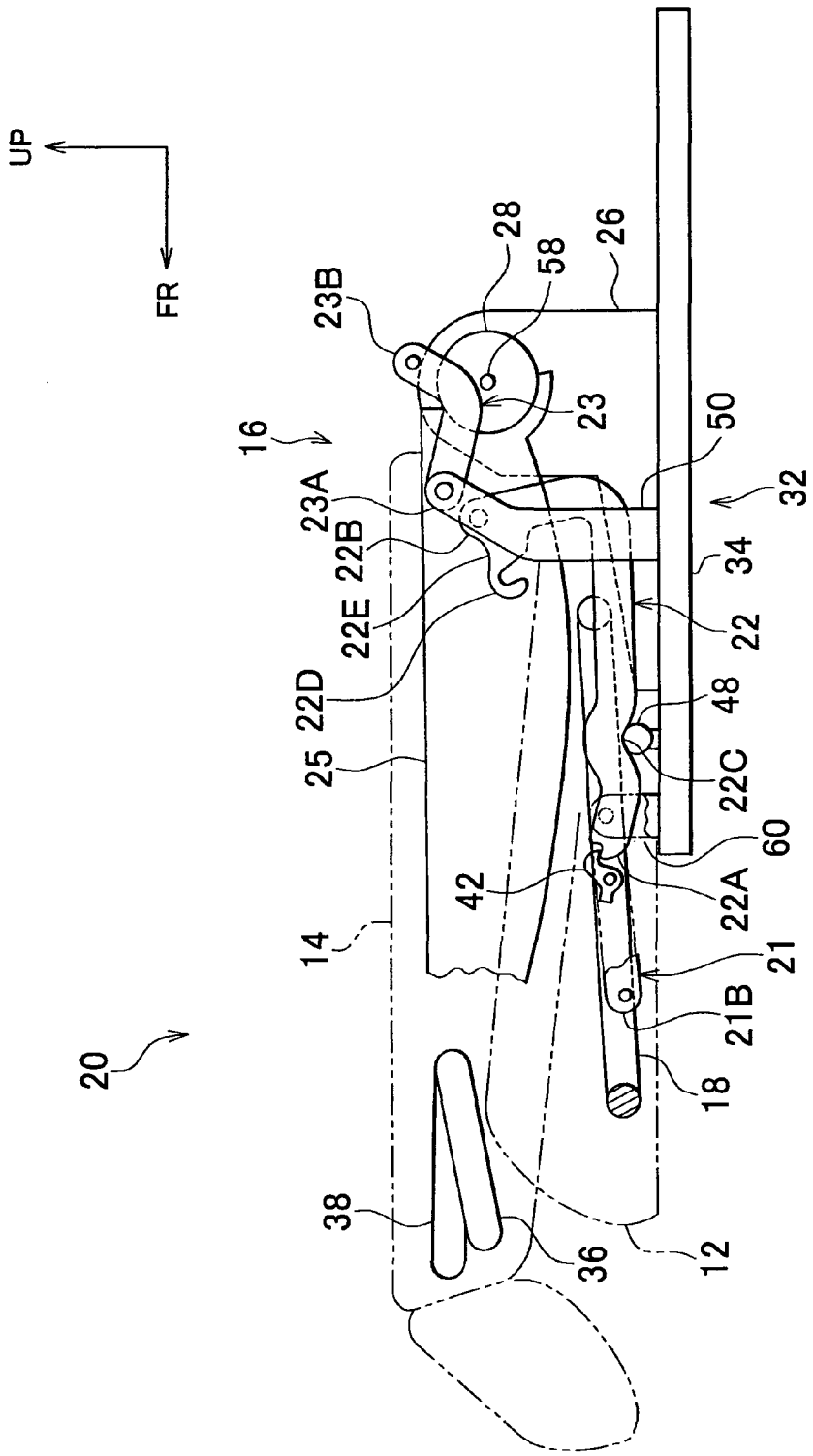
FIG. 10 is a side view showing the vehicular seat device in the second embodiment of the invention when the seat arrangement is a retracted state.

In FIGS. 8 to 10, a vehicular seat device 20 in accordance with a second embodiment of the invention has a seat cushion 12 and a seatback 14, and also has a first linking member 21, a second linking member 22 and a third linking member 23 as cooperation means. As seat arrangements, the vehicular seat device 20 assumes a seating state shown in FIG. 8 in which the seatback is not tilted forward, and the seat cushion is not moved forward downward relative to the vehicle or the seat cushion is not in the standing state, and in which an occupant (not shown) can sit, an entry/exit state shown in FIG. 9 in which the seatback 14 is tilted forward and the seat cushion 12 is put in a standing state, and a retracted state shown in FIG. 10 in which the seat cushion 12 is moved forward downward relative to the vehicle and the seatback 14 is superimposed on an upper side of the seat cushion 12.

In the seating state shown in FIG. 8, while the basic construction of the second linking member 22 is substantially the same as that of the first embodiment, the embodiment shown in FIGS. 8 to 10 has a construction in which a curved portion 22C that is convex in an upward direction relative to the vehicle when the seat arrangement is the seating state is formed in the second linking member 22, at a position rearward of a first end 22A thereof that is pivotably linked to a seat cushion frame 18. A second end 22B of the second linking member 22 is provided with an extension portion 22E that extends from the second end 22B toward the front of the vehicle. A distal end of the extension portion 22E remote from the second end 22B is provided, for example, integrally, with an engagement portion 22D that is detachably linked to a second end 23B of the third linking member 23. The engagement portion 22D is provided with a lock mechanism (not shown) for retaining a linked state of the second end 23B of the third linking member 23.

At a position rearward relative to the vehicle of the first end 21A of the first linking member 21 on an upper rail (not shown) of a longitudinal position adjustment mechanism 32, a support portion 48 protruded upward relative to the vehicle which supports the curved portion 22C of the second linking member 22 when the seat arrangement is the retracted state is provided (see FIG. 10).

As for the third linking member 23, a first end 23A thereof is pivotably linked to the vehicle floor member, and the second end 23B is pivotably and detachably linked to the engagement portion 22D provided on the second linking member 22. A construction is provided such that the linked state of the second end 23B relative to the engagement portion 22D is maintained when the seat arrangement is changed from the seating state to the entry/exit state, and such that the second end 23B is disengaged from the engagement portion 22D when the seat arrangement is changed from the seating state to the retracted state.

Concretely, as shown in FIG. 8, a support bracket 50 as the vehicle floor member stands on a base member 26 or the upper rail of the longitudinal position adjustment mechanism 32, and the first end 23A of the third linking member 23 is linked to an upper end of the support bracket 50. When the second end 23B of the third linking member 23 is linked to the engagement portion 22D of the second linking member 22, a four-node link mechanism whose nodes are the first end 23A and the second end 23B of the third linking member 23, the second end 22B of the second linking member 22, and the center of tilt 58 of the seatback 14 is formed as the drive mechanism 16.

Therefore, when the seat arrangement is changed from the seating state to the entry/exit state, the posture of the seat cushion 12 can be changed by the rotation of the second linking member 22 that is caused by the changing of the angle of the extension portion 22E based on the difference between the locus of the second end 23B of the third linking member 23 and the locus of the second end 22B of the second linking member 22 which are involved in the tilting of the seatback 14.

In FIG. 10, the third linking member 23 is urged clockwise in the plane of the drawing sheet about the first end 23A by urging means (not shown). A cable (not shown) extending from the operating lever 36 to the third linking member 23 is linked to the third linking member 23 from a direction opposite to the direction of the urging by the urging means, so that by operating the operating lever 36, the third linking member 23 can be pivoted clockwise in the plane of the drawing sheet about the first end 23A.

Other portions are substantially the same as those of the first embodiment, and the same portions are represented by the same reference characters in the drawings, and the description thereof is omitted.

This embodiment is constructed as described above, and the operation thereof will be described. In FIG. 8, when the seat arrangement of the vehicular seat device 20 is in the seating state, the lock member 42 is in a locked state in which the lock member 42 is engaged with the first end 22A of the second linking member 22, and the seatback 14 is also held in a locked state by the reclining mechanism 28. Therefore, the seat cushion 12 and the seatback 14 are held in the seating state in which, for example, they are each inclined rearward to an appropriate degree. When the seat arrangement is the seating state, the longitudinal position of the vehicular seat device 20 can be adjusted by sliding the upper rail on the lower rail 34.

Next, the operation performed when the seat arrangement is changed from the seating state to the entry/exit state will be described. In FIG. 8, when a predetermined operation with the operating lever 38 is performed, the cable (not shown) is drawn to disengage the lock member 42 from the first end 22A of the second linking member 22, so that the locked state is released, and at the same time the locked state of the seatback 14 held by the reclining mechanism 28 is released. Thus, the seatback 14 becomes able to be tilted. At this time, the second end 23B of the third linking member 23 is kept linked to the engagement portion 22D of the second linking member 22.

When from this state, the seatback 14 is tilted forward relative to the vehicle, the second end 22B of the second linking member 22 undergoes circular motion about the center of tilt 58 of the seatback 14, and the second end 23B of the third linking member 23 undergoes circular motion about the first end 23A of the third linking member 23. In the vehicular seat device 20, a four-node link mechanism whose nodes are the first end 23A and the second end 23B of the third linking member 23, the second end 22B of the second linking member 22, and the center of tilt 58 of the seatback 14 is formed as the drive mechanism 16. In this case, the locus of the second end 23B of the third linking member 23 and the locus of the second end 22B of the second linking member 22 are different from each other.

As for the extension portion 22E of the second linking member 22, if a single link is assumed to extend from the second end 23B of the third linking member 23 to the second end 22B of the second linking member 22, the posture of the link changes due to the difference between the loci of the second ends 23B, 22B. Due to the posture change of the link, that is, the posture change of the extension portion 22E, the second linking member 22 is caused to rotate clockwise in the plane of the drawing sheet, and therefore, the posture of the seat cushion 12 can be changed. That is, as the second linking member 22 pivots clockwise in the plane of the drawing sheet about the second end 22B, the posture of the seat cushion 12 changes so that a front portion thereof is raised upward relative to the vehicle.

Then, when the seatback 14 is tilted forward to a predetermined inclination angle as shown in FIG. 9, the seatback 14 is held by the stopper mechanism of the reclining mechanism 28 so as not to further tilt down while the seat cushion 12 is held in a standing state. Thus, the seat arrangement becomes the entry/exit state. When the vehicular seat device 20 is in the entry/exit state, the entry/exit space for a rearseat (not shown) of the vehicle is larger than when in the seating state. Therefore, the ease of entry/exit for the rearseat of vehicle improves. If the seat cushion 12 and the seatback 14 are slid forward relative to the vehicle through the use of the longitudinal position adjustment mechanism 32, the entry/exit space for the rearseat of the vehicle can be increased.

To return the seat arrangement from the entry/exit state to the seating state, the seatback 14 is drawn rearward relative to the vehicle, so that the second linking member 22 pivots counterclockwise in the plane of the drawing sheet about the second end 22B. Thus, the posture of the seat cushion 12 changes so that the front portion thereof descends. Then, when the seatback 14 returns to the predetermined inclination angle as shown in FIG. 8, the seatback 14 is locked by the reclining mechanism 28, and the first end 22A of the second linking member 22 is locked by the lock member 42. In this manner, the seat arrangement returns to the seating state.

Next, the operation performed when the seat arrangement is changed from the seating state to the retracted state will be described. In FIG. 8, when a predetermined operation with the operating lever 36 is performed, the cable (not shown) is drawn to release the locked state of the seatback 14 held by the reclining mechanism 28, so that the seatback 14 becomes able to be tilted, and at the same time, the second end 23B of the third linking member 23 is disengaged from the engagement portion 22D of the second linking member 22 against the springy force of the urging means (not shown). At this time, the locked state of the first end 22A of the second linking member 22 held by the lock member 42 is maintained, so that the second linking member 22 cannot be rotated relative to the seat cushion frame 18.

Then, when the seatback 14 is tilted forward relative to the vehicle, the first linking member 21 pivots forward relative to the vehicle about the first end 21A, and furthermore, as the second linking member 22 moves forward downward relative to the vehicle, the seat cushion 12 is moved forward downward relative to the vehicle. At this time, since the second end 23B of the third linking member 23 has been disengaged from the engagement portion 22D of the second linking member 22, the seatback 14 can be tilted despite the locked state of the second linking member 22 relative to the seat cushion frame 18.

Then, as shown in FIG. 10, the seat cushion 12 is moved forward downward relative to the vehicle, and the seatback 14 is superimposed on the upper side of the seat cushion 12. Thus, the seat arrangement becomes the retracted state. At this time, the curved portion 22C of the second linking member 22 becomes supported by the support portion 48. In the retracted state, since the seatback 14 is tilted down, the space above the vehicular seat device 20 can be utilized as a cargo space.

To return the seat arrangement from the retracted state to the seating state, the seatback 14 is pulled up rearward relative to the vehicle, so that the seat cushion 12 moves rearward and upward relative to the vehicle in accordance with the movements of the first linking member 21 and the second linking member 22. At this time, since the second end 23B of the third linking member 23 has been disengaged from the engagement portion 22D of the second linking member 22, the seatback 14 can be tilted in the pull-up direction despite the locked state of the second linking member 22 relative to the seat cushion frame 18.

Then, when the seatback 14 returns to the predetermined inclination angle as shown in FIG. 8, the seatback 14 is locked by the reclining mechanism 28, and the second end 23B of the third linking member 23 is linked to the engagement portion 22D of the second linking member 22 by the springy force of the urging means. In this manner, the seat arrangement returns to the seating state.

As described above, since the change of the seat arrangement is synchronized with the tilting of the seatback 14, the vehicular seat device 20 is cable of reducing the burden of operation on an occupant in changing the seat arrangement, while allowing various seat arrangements. In particular, since the vehicular seat device 20 includes, as the drive mechanism 16, a four-node link mechanism constructed of the second linking member 22 and the third linking member 23, the posture of the seat cushion 12 can be smoothly changed synchronously with the tilting of the seatback 14, so that the operational feeling for an occupant can be improved.

Figure 11:
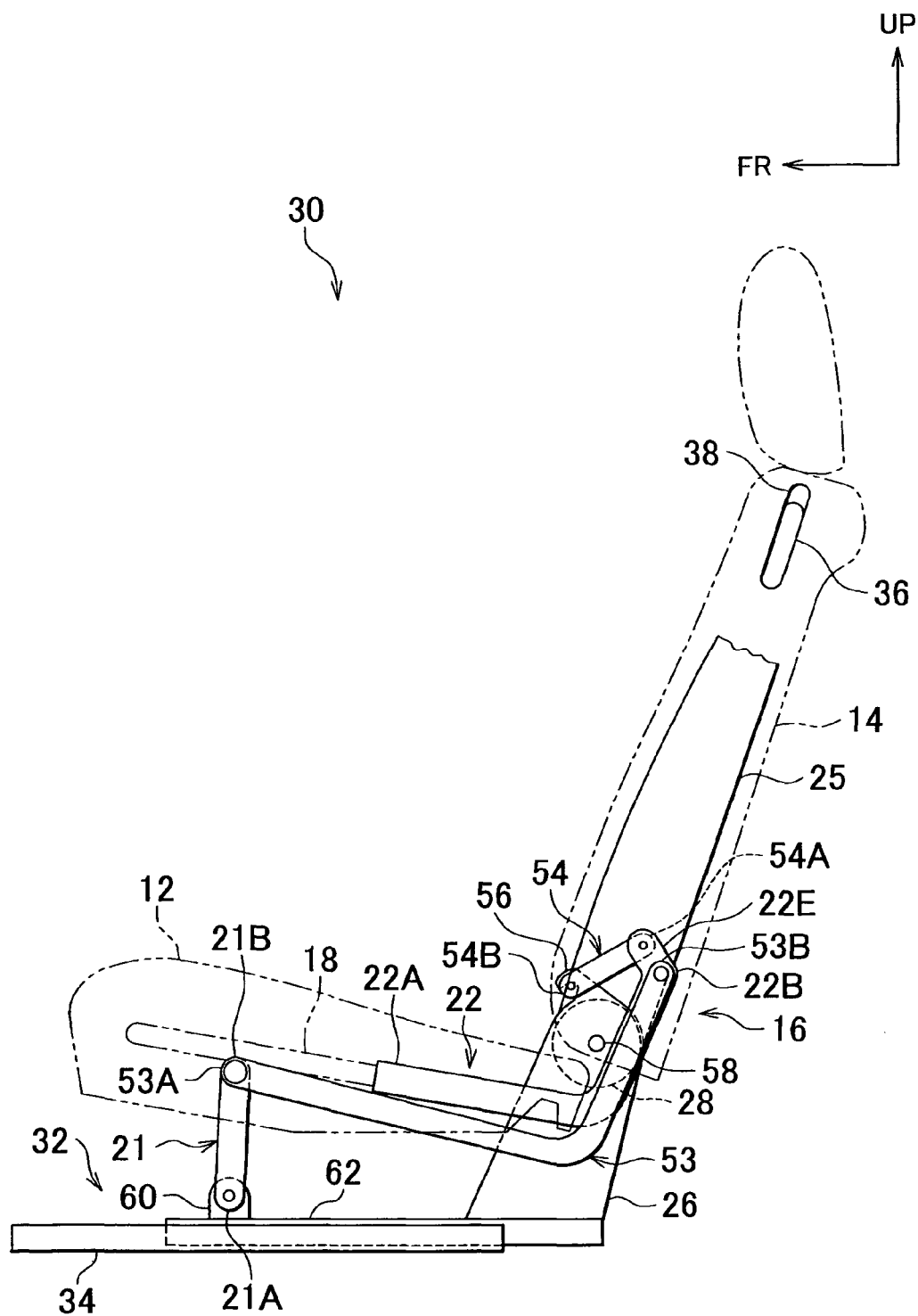
FIG. 11 is a side view showing a vehicular seat device in accordance with a third embodiment of the invention when the seat arrangement is a seating state.
Figure 12:
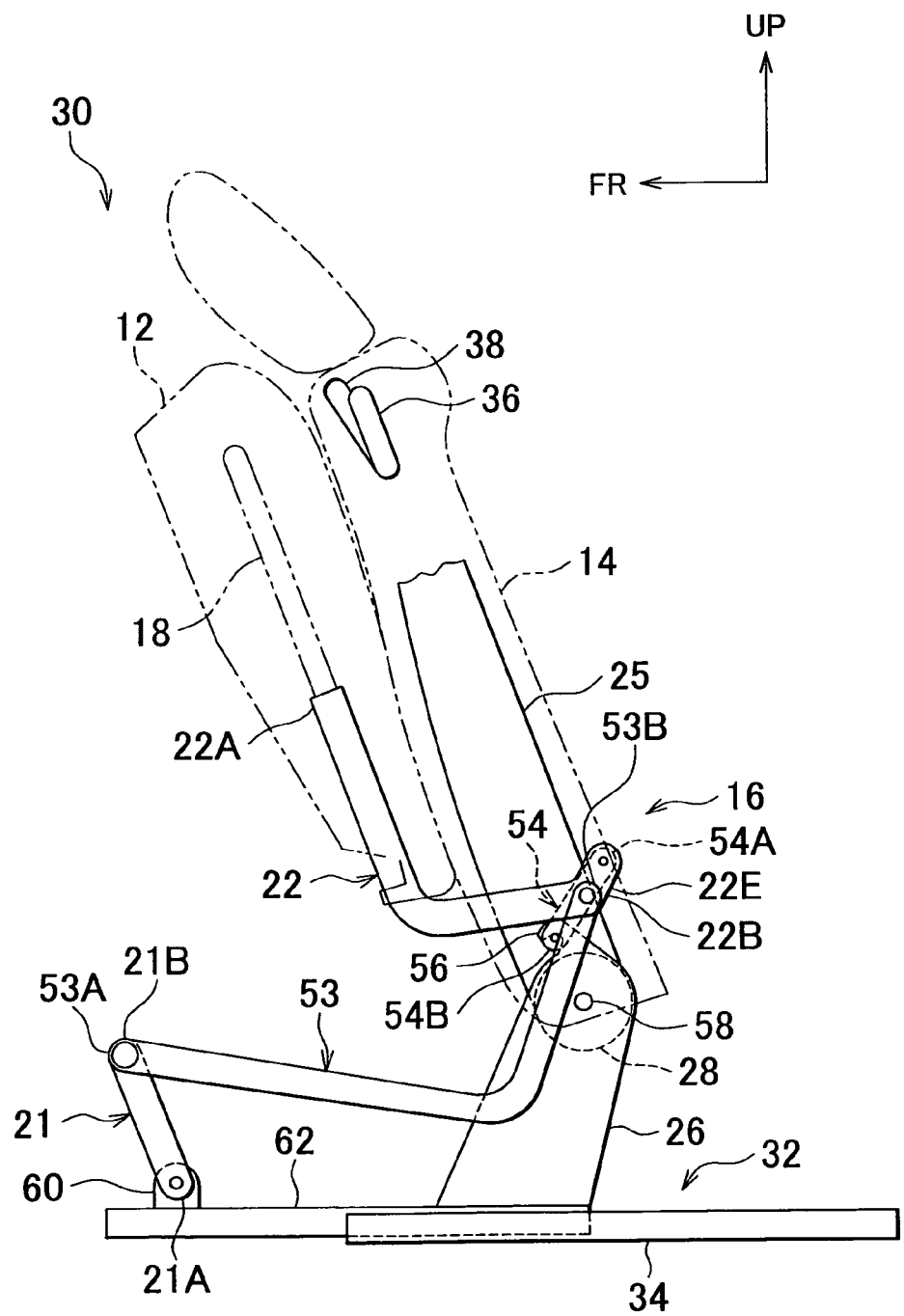
FIG. 12 is a side view showing the vehicular seat device in the third embodiment of the invention when the seat arrangement is an entry/exit state.
Figure 13:
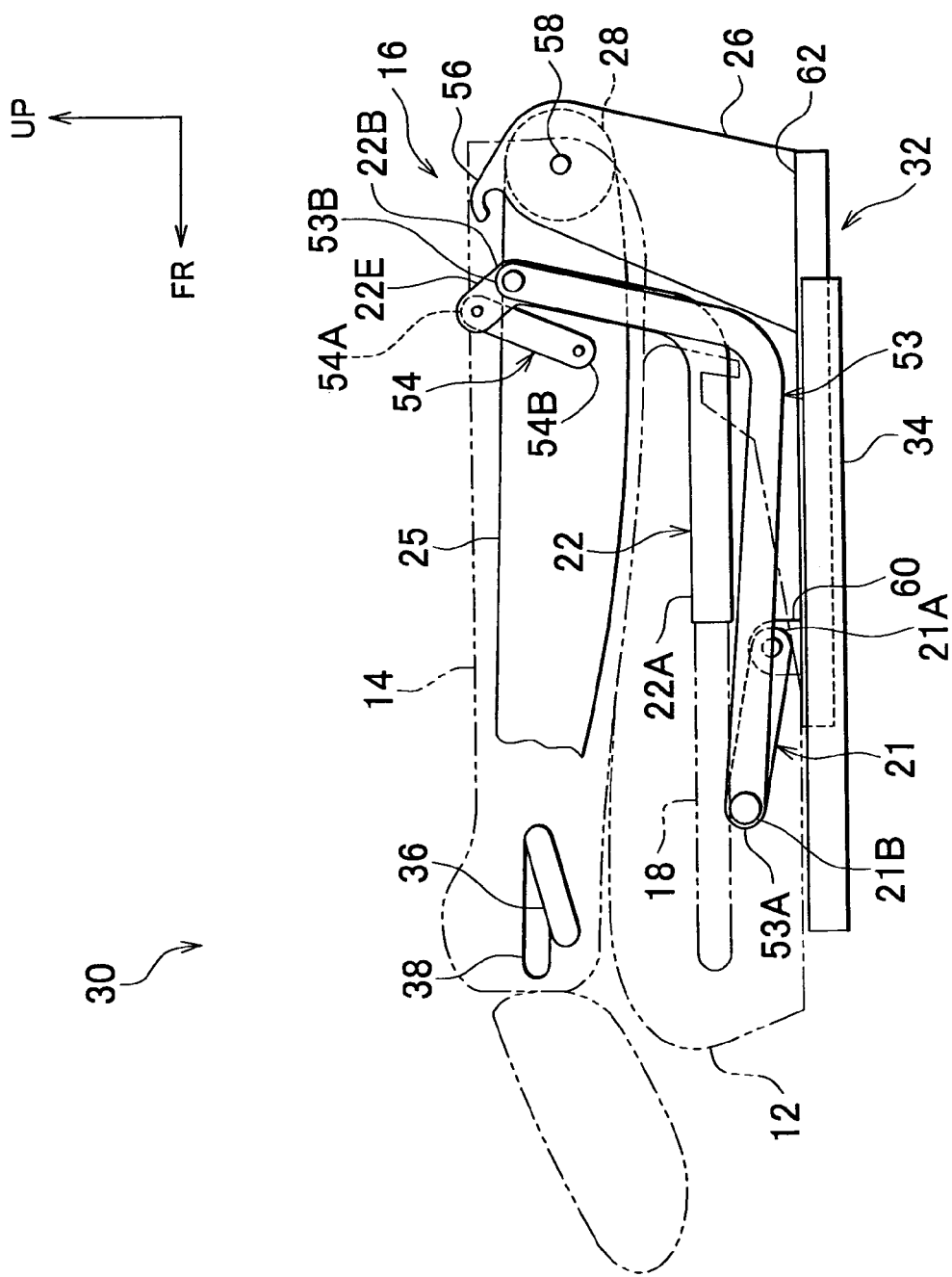
FIG. 13 is a side view showing the vehicular seat device in the third embodiment of the invention when the seat arrangement is a retracted state.

In FIGS. 11 to 13, a vehicular seat device 30 in accordance with a third embodiment of the invention has a seat cushion 12 and a seatback 14, and also has a first linking member 21, a second linking member 22, a third linking member 53 and a fourth linking member 54 as cooperation means. As seat arrangements, the vehicular seat device 30 assumes a seating state shown in FIG. 11 in which the seatback is not tilted forward, and the seat cushion is not moved forward downward relative to the vehicle or the seat cushion is not in the standing state, and in which an occupant (not shown) can sit, an entry/exit state shown in FIG. 12 in which the seatback 14 is tilted forward and the seat cushion 12 is put in a standing state, and a retracted state shown in FIG. 13 in which the seat cushion 12 is moved forward downward relative to the vehicle and the seatback 14 is superimposed on an upper side of the seat cushion 12.

In FIG. 11, a first end 21A of the first linking member 21 is pivotably linked to the vehicle floor member, for example, a mount bracket 60 on an upper rail 62 in a longitudinal position adjustment mechanism 32, and a second end 21B thereof is pivotably linked to a first end 53A of the third linking member 53.

In this embodiment, unlike the first embodiment and the second embodiment, the second linking member 22 is constructed so that the first end 22A thereof is fixed to a seat cushion frame 18, and the second linking member 22 is pivoted about a second end 22B that is linked to a seatback frame 25, thus changing the posture of the seat cushion 12. In FIG. 11, the second end 22B of the second linking member 22 is provided with an extension portion 22E that is protruded from the second end 22B diagonally forward upward direction of the vehicle. A first end 54A of the fourth linking member 54 is linked to a distal end of the extension portion 22E remote from the second end 22B.

The third linking member 53 is, for example, a boomerang-shaped link. A first end 53A thereof is pivotably linked to the second end 21B of the first linking member 21, and a second end 53B thereof is pivotably linked to the seatback frame 25. As shown in FIG. 11, the third linking member 53, together with the first linking member 21, supports the seat cushion 12 when the seat arrangement is the seating state.

Concretely, the first end 53A of the third linking member 53 which is linked to the second end 21B of the first linking member 21 supports a front portion of the seat cushion 12 that is forward of a base member 26 described later. A rear portion of the seat cushion 12 is supported by, for example, a support portion (not shown) provided on the base member 26. The second end 53B of the third linking member 53 is linked to the seatback frame 25, for example, coaxially with the second end 22B of the second linking member 22.

In FIG. 11, a first end 54A of the fourth linking member 54 is pivotably linked to a position on the second linking member 22 remote from the second end 22B, that is, the distal end of the extension portion 22E. A second end 54B of the fourth linking member 54 is pivotably and detachably linked to an engagement portion 56 provided in the base member 26. A construction is provided such that the linked state of the second end 54B relative to the engagement portion 56 is maintained when the seat arrangement is changed from the seating state to the entry/exit state, and such that the second end 54B is disengaged from the engagement portion 56 when the seat arrangement is changed from the seating state to the retracted state. The engagement portion 56 is provided with a lock mechanism (not shown) for retaining the locked state of the second end 54B of the fourth linking member 54.

Concretely, when the second end 54B of the fourth linking member 54 is linked to the engagement portion 56 of the base member 26 as shown in FIG. 11, a four-node link mechanism whose nodes are the second end 54B and the first end 54A of the fourth linking member 54, the second end 22B of the second linking member 22, and the center of tilt 58 of the seatback 14 is formed as the drive mechanism 16. Therefore, when the seat arrangement is changed from the seating state to the entry/exit state, the posture of the seat cushion 12 can be changed by the rotation of the second linking member 22 that is caused by the changing of the angle of the extension portion 22E based on the difference between the locus of the first end 54A of the fourth linking member 54 and the locus of the second end 22B of the second linking member 22 which are involved in the tilting of the seatback 14.

Other portions are substantially the same as those of the first embodiment, and the same portions are represented by the same reference characters in the drawings, and the description thereof is omitted.

This embodiment is constructed as described above, and the operation thereof will be described below. In FIG. 11, when the seat arrangement of the vehicular seat device 30 is in the seating state, the seatback 14 is held in a locked state by the reclining mechanism 28, and the front portion of the seat cushion 12 forward of the base member 26 described below is supported by the first linking member 21 and the third linking member 53, and the rear portion of the seat cushion 12 is supported by the support portion (not shown) of the base member 26. Therefore, the seat cushion 12 and the seatback 14 are held in the seating state in which, for example, they are each inclined rearward to an appropriate degree. When the seat arrangement is the seating state, the longitudinal position of the vehicular seat device 30 can be adjusted by sliding the upper rail 62 on the lower rail 34.

Next, the operation performed when the seat arrangement is changed from the seating state to the entry/exit state will be described. In FIG. 11, when a predetermined operation with the operating lever 38 is performed, the cable (not shown) is drawn so that the locked state of the seatback 14 held by the reclining mechanism 28 is released. Thus, the seatback 14 becomes able to be tilted. At this time, the second end 54B of the fourth linking member 54 is kept linked to the engagement portion 56 of the base member 26.

When from this state, the seatback 14 is tilted forward relative to the vehicle, the second end 22B of the second linking member 22 undergoes circular motion about the center of tilt 58 of the seatback 14, and the first end 54A of the fourth linking member 54 undergoes circular motion about the second end 54B of the fourth linking member 54. In the vehicular seat device 30, a four-node link mechanism whose nodes are the second end 54B and the first end 54A of the fourth linking member 54, the second end 22B of the second linking member 22, and the center of tilt 58 of the seatback 14 is formed as the drive mechanism 16. In this case, the locus of the first end 54A of the fourth linking member 54 and the locus of the second end 22B of the second linking member 22 are different from each other.

As for the extension portion 22E of the second linking member 22, if a single link is assumed to extend from the first end 54A of the fourth linking member 54 to the second end 22B of the second linking member 22, the posture of the link changes due to the difference between the loci of the two ends of the link extending between the aforementioned first end 54A and the aforementioned second end 22B. Due to the posture change of the link, that is, the posture change of the extension portion 22E, the second linking member 22 is caused to rotate clockwise in the plane of the drawing sheet, and therefore, the posture of the seat cushion 12 can be changed. That is, as the second linking member 22 pivots clockwise in the plane of the drawing sheet about the second end 22B, the posture of the seat cushion 12 changes so that a front portion thereof is raised upward relative to the vehicle.

Then, when the seatback 14 is tilted forward to a predetermined inclination angle as shown in FIG. 12, the seatback 14 is held by the stopper mechanism of the reclining mechanism 28 so as not to further tilt down while the seat cushion 12 is held in a standing state. Thus, the seat arrangement becomes the entry/exit state. When the vehicular seat device 30 is in the entry/exit state, the entry/exit space for a rearseat (not shown) of the vehicle is larger than when in the seating state. Therefore, the ease of entry/exit for the rearseat of the vehicle improves. If the seat cushion 12 and the seatback 14 are slid forward relative to the vehicle through the use of the longitudinal position adjustment mechanism 32, the entry/exit space for the rearseat of the vehicle can be increased.

To return the seat arrangement from the entry/exit state to the seating state, the seatback 14 is drawn rearward relative to the vehicle, so that the second linking member 22 pivots counterclockwise in the plane of the drawing sheet about the second end 22B. Thus, the posture of the seat cushion 12 changes so that the front portion thereof descends. Then, when the seatback 14 returns to the predetermined inclination angle as shown in FIG. 11, the seatback 14 is locked by the reclining mechanism 28, and the front portion of the seat cushion 12 forward of the support portion (described below) of the base member 26 is supported by the first linking member 21 and the third linking member 53, and the rear portion of the seat cushion 12 is supported by the support portion of the base member 26. In this manner, the seat arrangement returns to the seating state.

Next, the operation performed when the seat arrangement is changed from the seating state to the retracted state will be described. In FIG. 11, when a predetermined operation with the operating lever 36 is performed, the cable (not shown) is drawn to release the locked state of the seatback 14 held by the reclining mechanism 28. Furthermore, due to the operation with the operating lever 36, the lock mechanism (not shown) of the engagement portion 56 of the base member 26 is released, so that the second end 54B of the fourth linking member 54 becomes able to be disengaged from the engagement portion 56. Thus, the seatback 14 becomes able to be tilted. Since the second linking member 22 is fixed at its first end 22A to the seat cushion frame 18, the second linking member 22 does not rotate relative to the seat cushion frame 18.

Then, when the seatback 14 is tilted forward relative to the vehicle, the first linking member 21 pivots forward relative to the vehicle about the first end 21A, and furthermore, as the second linking member 22 moves forward downward relative to the vehicle, the seat cushion 12 is moved forward downward relative to the vehicle. At this time, since the second end 54B of the fourth linking member 54 is disengaged from the engagement portion 56 of the base member 26, the seatback 14 can be tilted despite the locked state of the second linking member 22 relative to the seat cushion frame 18. At this time, the third linking member 53 also moves forward downward relative to the vehicle, as the first linking member 21 pivots and the seatback 14 tilts.

Then, as shown in FIG. 13, the seat cushion 12 is moved forward downward relative to the vehicle, and the seatback 14 is superimposed on the upper side of the seat cushion 12. Thus, the seat arrangement becomes the retracted state. In the retracted state, since the seatback 14 is tilted down, the space above the vehicular seat device 30 can be utilized as a cargo space.

To return the seat arrangement from the retracted state to the seating state, the seatback 14 is pulled up rearward relative to the vehicle, so that the seat cushion 12 moves rearward and upward relative to the vehicle in accordance with the movements of the first linking member 21 and the second linking member 22. At this time, since the second end 54B of the fourth linking member 54 has been disengaged from the engagement portion 56 of the base member 26, the seatback 14 can be tilted in the pull-up direction despite the fixation of the second linking member 22 to the seat cushion frame 18.

Then, when the seatback 14 returns to the predetermined inclination angle as shown in FIG. 11, the seatback 14 is locked by the reclining mechanism 28, and the second end 54B of the fourth linking member 54 is linked to the engagement portion 56 of the base member 26, and is locked by the lock mechanism. In this manner, the seat arrangement returns to the seating state.

As described above, since the change of the seat arrangement is synchronized with the tilting of the seatback 14, the vehicular seat device 30 is cable of reducing the burden of operation on an occupant in changing the seat arrangement, while allowing various seat arrangements. In particular, since the vehicular seat device 30 includes, as the drive mechanism 16, a four-node link mechanism constructed of the second linking member 22 and the fourth linking member 54, the posture of the seat cushion 12 can be smoothly changed synchronously with the tilting of the seatback 14, so that the operational feeling for an occupant can be improved.

Figure 14:
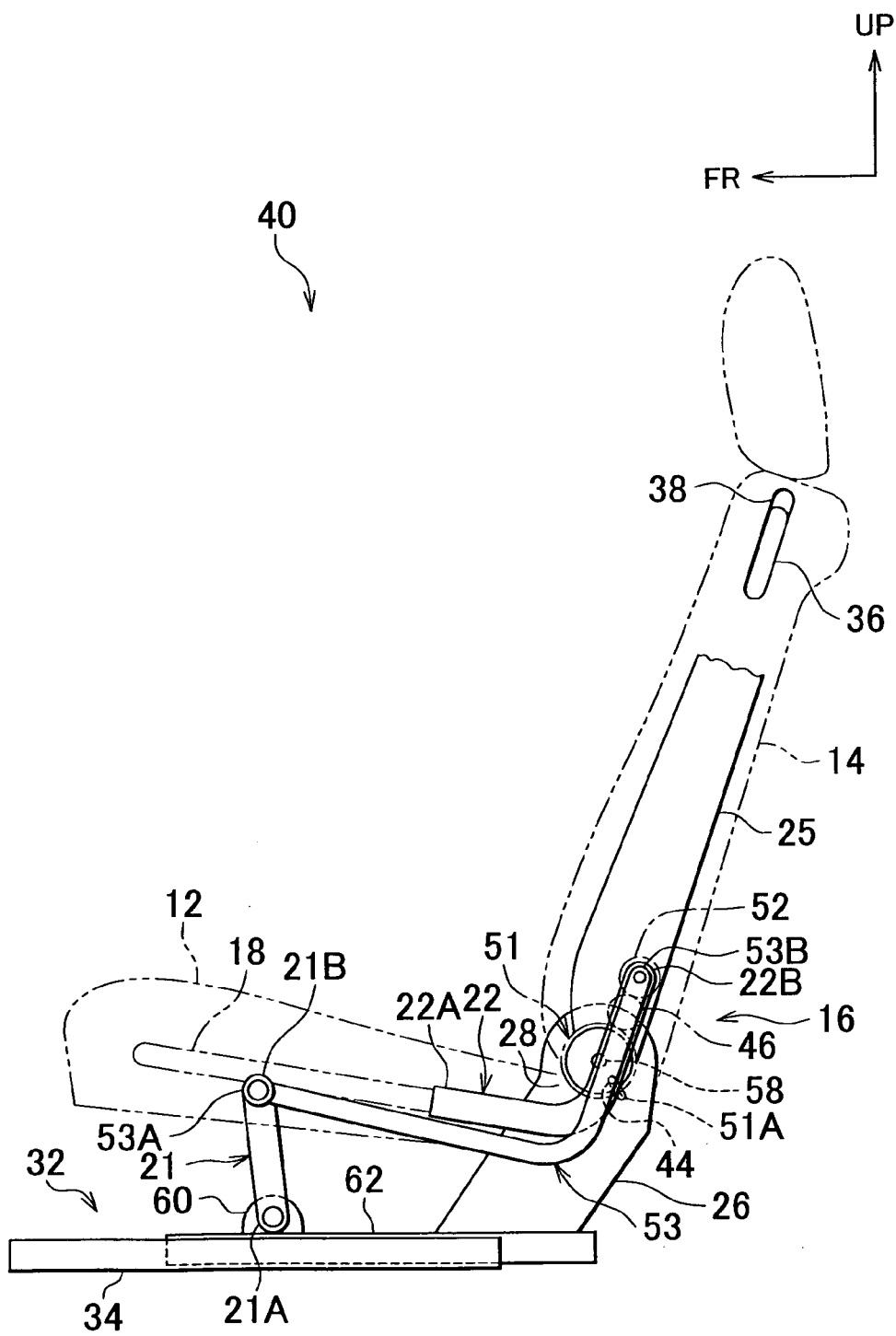
FIG. 14 is a side view showing a vehicular seat device in accordance with a fourth embodiment of the invention when the seat arrangement is the seating state.
Figure 15:
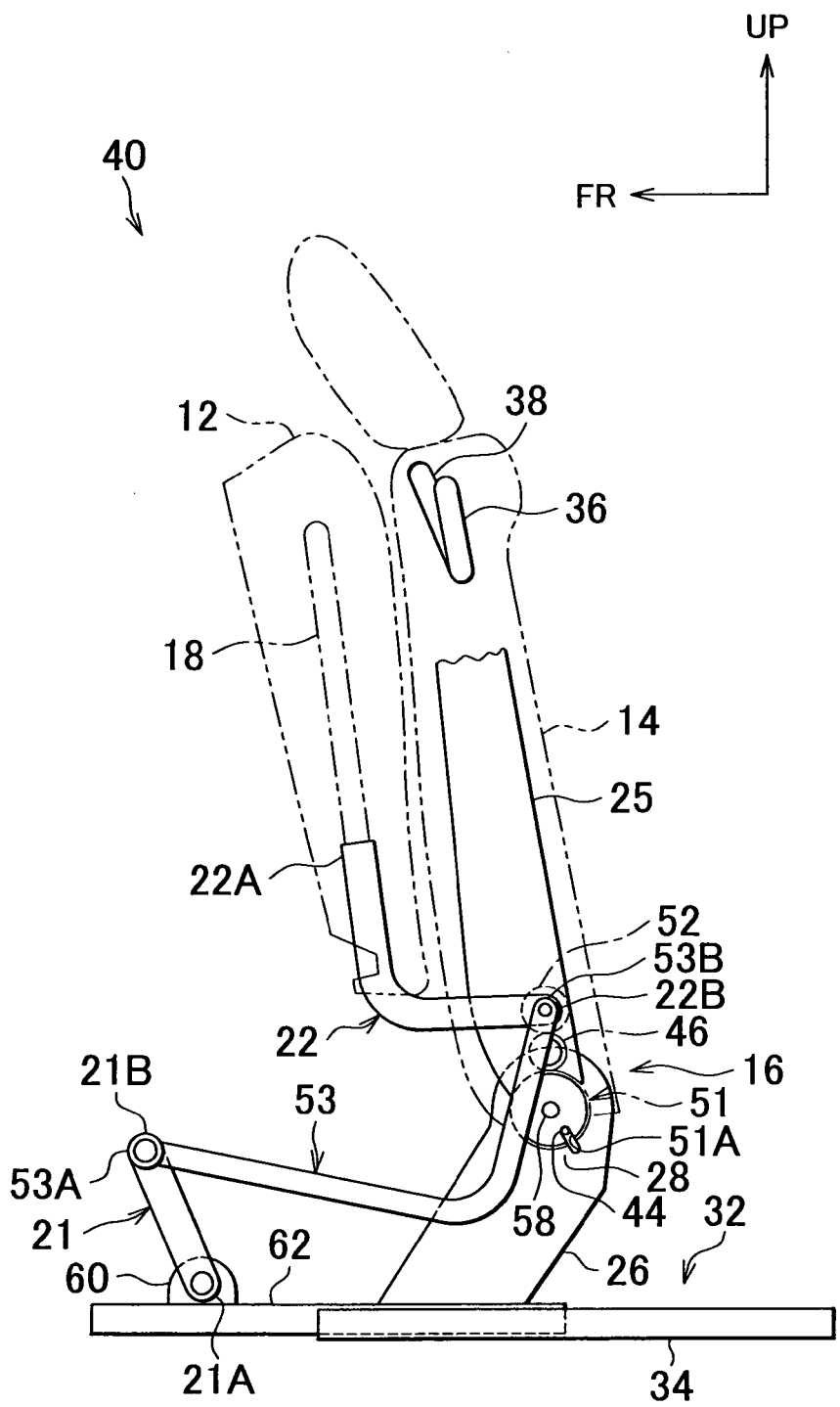
FIG. 15 is a side view showing the vehicular seat device in the fourth embodiment of the invention when the seat arrangement is the entry/exit state.
Figure 16:
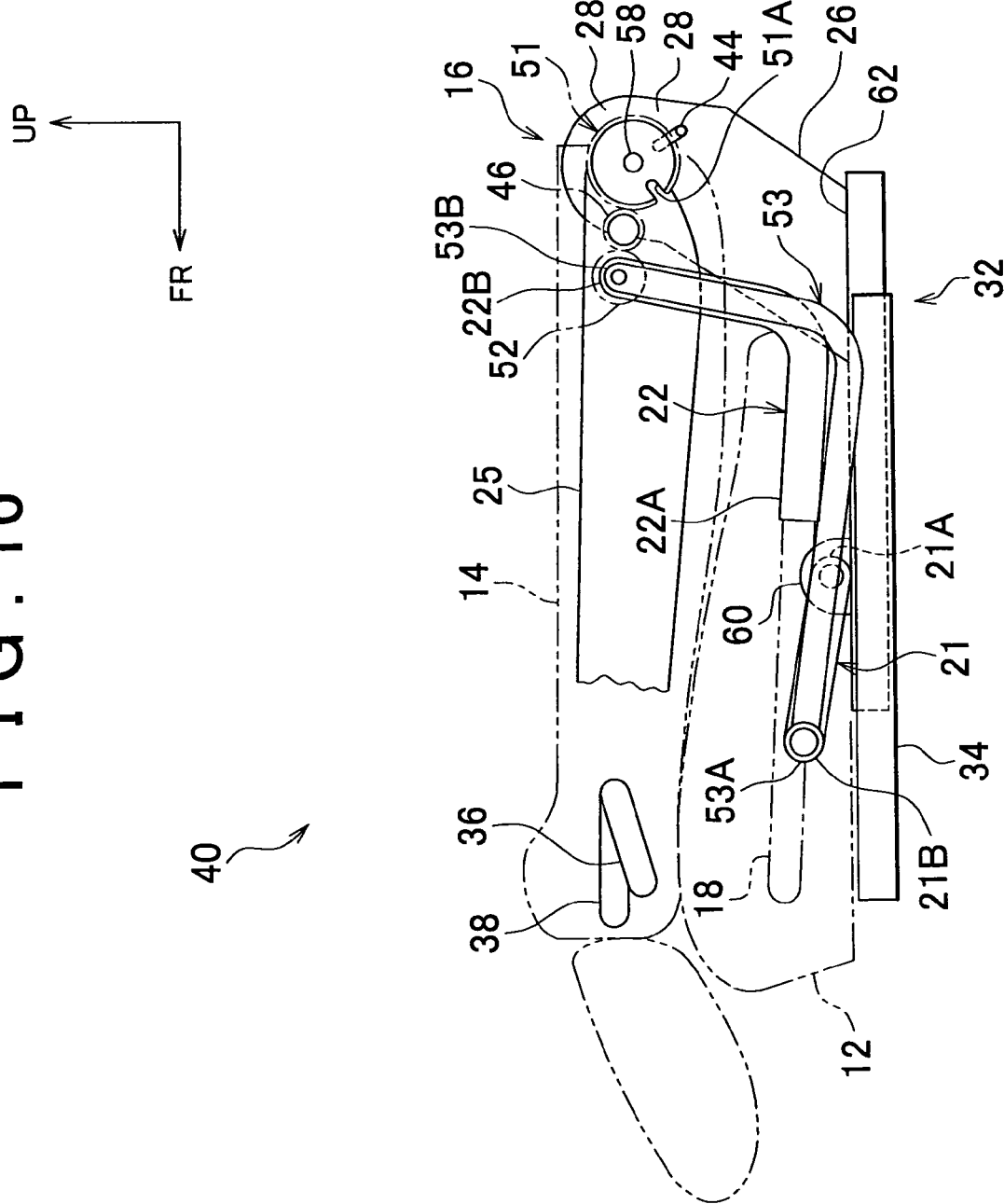
FIG. 16 is a side view showing the vehicular seat device in the fourth embodiment of the invention when the seat arrangement is the retracted state.

In FIGS. 14 to 16, a vehicular seat device 40 in accordance with a fourth embodiment of the invention has a seat cushion 12 and a seatback 14, and also has a first linking member 21, a second linking member 22, and a third linking member 53 as cooperation means, as well as a drive mechanism 16. As seat arrangements, the vehicular seat device 40 assumes a seating state shown in FIG. 14 in which the seatback is not tilted forward, and the seat cushion is not moved forward downward relative to the vehicle or the seat cushion is not in the standing state, and in which an occupant (not shown) can sit, an entry/exit state shown in FIG. 15 in which the seatback 14 is tilted forward and the seat cushion 12 is put in a standing state, and a retracted state shown in FIG. 16 in which the seat cushion 12 is moved forward downward relative to the vehicle and the seatback 14 is superimposed on an upper side of the seat cushion 12.

The construction of the third linking member 53 is substantially the same as that in the third embodiment, and the construction of the drive mechanism 16 is substantially the same as that in the first embodiment. Other portions are substantially the same as those of the first embodiment or the third embodiment, and the same portions are represented by the same reference characters in the drawings, and the description thereof is omitted.

This embodiment is constructed as described above, and the operation thereof will be described below. In FIG. 14, when the seat arrangement of the vehicular seat device 40 is in the seating state, the seatback 14 is held in a locked state by the reclining mechanism 28, and the front portion of the seat cushion 12 forward of the base member 26 described below is supported by the first linking member 21 and the third linking member 53, and the rear portion of the seat cushion 12 is supported by the support portion (not shown) of the base member 26. Therefore, the seat cushion 12 and the seatback 14 are held in the seating state in which, for example, they are each inclined rearward to an appropriate degree. When the seat arrangement is the seating state, the longitudinal position of the vehicular seat device 40 can be adjusted by sliding the upper rail 62 on the lower rail 34.

Next, the operation performed when the seat arrangement is changed from the seating state to the entry/exit state will be described. In FIG. 14, when a predetermined operation with the operating lever 38 is performed, the cable (not shown) is drawn so that the locked state of the seatback 14 held by the reclining mechanism 28 is released. Thus, the seatback 14 becomes able to be tilted. The first gear 51 is restricted in pivoting by the lock pin 44.

When from this state, the seatback 14 is tilted forward relative to the vehicle, the idle gear 46 and the second gear 52 revolve around the first gear 51, which is restricted in pivoting. Due to the meshing of the idle gear 46 with the first gear 51, the idle gear 46 rotates counterclockwise in the plane of the drawing sheet. As the idle gear 46 rotates, the second gear 52, meshing with the idle gear 46, rotates clockwise in the plane of the drawing sheet.

Since the second gear 52 is rotationally driven by the first gear 51 in this manner, the second linking member 22 pivots clockwise in the plane of the drawing sheet about the second end 22B, that is, the posture of the seat cushion 12 changes so that the front portion thereof is raised upward relative to the vehicle. Then, when the seatback 14 is tilted forward to a predetermined inclination angle as shown in FIG. 15, the seatback 14 is held by the stopper mechanism of the reclining mechanism 28 so as not to further tilt down while the seat cushion 12 is held in a standing state. Thus, the seat arrangement becomes the entry/exit state.

When the vehicular seat device 40 is in the entry/exit state, the entry/exit space for a rearseat (not shown) of the vehicle is larger than when in the seating state. Therefore, the ease of entry/exit for the rearseat of the vehicle improves. If the seat cushion 12 and the seatback 14 are slid forward relative to the vehicle through the use of the longitudinal position adjustment mechanism 32, the entry/exit space for the rearseat of the vehicle can be increased.

To return the seat arrangement from the entry/exit state to the seating state, the seatback 14 is drawn rearward relative to the vehicle, so that the idle gear 46 and the second gear 52 revolve around the first gear 51, which is restricted in pivoting. Due to the meshing of the idle gear 46 with the first gear 51, the idle gear 46 rotates clockwise in the plane of the drawing sheet. As the idle gear 46 rotates, the second gear 52, meshing with the idle gear 46, rotates counterclockwise in the plane of the drawing sheet.

As the second gear 52 is rotationally driven by the first gear 51 in this manner, the second linking member 22 pivots counterclockwise in the plane of the drawing sheet about the second end 22B. Thus, the posture of the seat cushion 12 changes so that the front portion thereof descends. Then, when the seatback 14 returns to the predetermined inclination angle as shown in FIG. 14, the seatback 14 is locked by the reclining mechanism 28, and the front portion of the seat cushion 12 forward of the support portion (described below) of the base member 26 is supported by the first linking member 21 and the third linking member 53, and the rear portion of the seat cushion 12 is supported by the support portion of the base member 26. In this manner, the seat arrangement returns to the seating state.

Next, the operation performed when the seat arrangement is changed from the seating state to the retracted state will be described. In FIG. 14, when a predetermined operation with the operating lever 36 is performed, the cable (not shown) is drawn to release the locked state of the seatback 14 held by the reclining mechanism reclining mechanism 28, so that the seatback 14 becomes able to be tilted. At the same time, the lock pin 44 is disengaged from the cutout 51A of the first gear 51, so that the first gear 51 becomes freely pivotable relative to the base member 26. Since the second linking member 22 is fixed at its first end 22A to the seat cushion frame 18, the second linking member 22 does not rotate relative to the seat cushion frame 18.

Then, when the seatback 14 is tilted forward relative to the vehicle, the first linking member 21 pivots forward relative to the vehicle about the first end 21A, and furthermore, as the second linking member 22 moves forward downward relative to the vehicle, the seat cushion 12 is moved forward downward relative to the vehicle. At this time, as the second gear 52 moves, the idle gear 46 rotates counterclockwise in the plane of the drawing sheet and the first gear 51 rotates clockwise in the plane of the drawing sheet. Since the first gear 51 is freely rotatable, the fixation of the second linking member 22 to the seat cushion frame 18 does not impede the revolution of the second gear 52 about the center of tilt 58 of the seatback 14, so that the seatback 14 can be tilted easily. At this time, the third linking member 53 also moves forward downward relative to the vehicle, as the first linking member 21 pivots and the seatback 14 tilts.

Then, as shown in FIG. 16, the seat cushion 12 is moved forward downward relative to the vehicle, and the seatback 14 is superimposed on the upper side of the seat cushion 12. Thus, the seat arrangement becomes the retracted state. In the retracted state, since the seatback 14 is tilted down, the space above the vehicular seat device 40 can be utilized as a cargo space.

To return the seat arrangement from the retracted state to the seating state, the seatback 14 is pulled up rearward relative to the vehicle, so that the seat cushion 12 moves rearward and upward relative to the vehicle in accordance with the movements of the first linking member 21 and the second linking member 22. At this time, as the second gear 52 moves, the idle gear 46 rotates clockwise in the plane of the drawing sheet and the first gear 51 rotates counterclockwise in the plane of the drawing sheet. Since the first gear 51 is freely rotatable, the fixation of the second linking member 22 to the seat cushion frame 18 does not impede the revolution of the second gear 52 about the center of tilt 58 of the seatback 14, so that the seatback 14 can be tilted in the pull-up direction.

Then, when the seatback 14 returns to the predetermined angle as shown in FIG. 14, the seatback 14 is locked by the reclining mechanism 28. Furthermore, as the position of the cutout 51A of the first gear 51 reaches the position of the lock pin 44, the lock pin 44 enters the cutout 51A, so that the first gear 51 is locked by the lock pin 44. In this manner, the seat arrangement returns to the seating state.

As described above, since the change of the seat arrangement is synchronized with the tilting of the seatback 14, the vehicular seat device 40 is cable of reducing the burden of operation on an occupant in changing the seat arrangement, while allowing various seat arrangements. In particular, since the vehicular seat device 40 employs the first gear 51 and the second gear 52 as the drive mechanism 16, the posture of the seat cushion 12 can be smoothly changed synchronously with the tilting of the seatback 14, so that the operational feeling for an occupant can be improved.

Although the foregoing embodiments each include the longitudinal position adjustment mechanism 32, this is not restrictive, but it is also allowable to adopt a construction in which the base member 26 is directly fixed to the vehicle floor panel. The vehicle floor member of the invention includes the vehicle floor panel. Although the vehicle floor member includes, for example, the mount bracket provided on the upper rail of the longitudinal position adjustment mechanism, the support bracket and the vehicle floor panel, this is not restrictive, but it is also allowable to include the member that is provided between the vehicular seat device and the vehicle floor panel, and that connects the vehicular seat device to the vehicle floor panel. Furthermore the configurations of the linking members, and the positions of linkage to the seat cushion frame 18 or the seatback frame 25, etc., are not limited to the constructions shown in the drawings.

Although in the first embodiment and the fourth embodiment, the first gear 51 is provided as a first force transmission member and the second gear 52 is provided as a second force transmission member, the first force transmission member and the second force transmission member are not limited to those gears. For example, the first and second force transmission members may be friction wheels, or may also be combinations of pulleys and force transmission members wrapped on the pulleys.

The invention claimed is:

1. A vehicular seat device comprising:
    a seat cushion;
    a seatback which is provided on a base member via a reclining mechanism and whose inclination angle is adjustable;
    a cooperation portion that changes a posture of the seat cushion synchronously with tilting of the seatback; and
    a drive mechanism configured to rotationally drive a member of the cooperation portion about a position on the seatback, the drive mechanism including a first force transmission member, a second force transmission member, and an idle gear which is located between the first force transmission member and the second force transmission member and which meshes with the first force transmission member and the second force transmission member, the second force transmission member being coupled coaxially to the member of the cooperation portion and being configured to be rotationally driven;
    wherein as seat arrangements, the vehicular seat device assumes an entry/exit state in which the seatback is tilted forward and the seat cushion is in a flipped position, a retracted state in which the seat cushion is moved forward downward relative to a vehicle and the seat cushion is superimposed on an upper side of the seatback, and a seating state in which the seatback is not tilted forward, and the seat cushion is not moved forward downward relative to the vehicle or the seat cushion is not in the flipped position, and the seat arrangement is changed via the cooperation portion; and
    wherein the first transmission member is configured to pivot and the second transmission member and the idle gear are configured to rotate counterclockwise when the seat arrangement is changed between the seating state and the retracted state.

2. The vehicular seat device according to claim 1, wherein the cooperation portion includes:
    a first linking member whose first end is pivotably linked to a vehicle floor member, and whose second end is pivotably linked to a seat cushion frame of the seat cushion; and
    a second linking member whose first end is pivotably linked to a position on the seat cushion frame which is rearward, relative to the vehicle, of a linking position of the first linking member, and whose second end is pivotably linked to a seatback frame of the seatback; wherein
    the drive mechanism causes the second linking member to be drivable rotationally about the second end of the second linking member and changes the posture of the seat cushion via the second linking member synchronously with the tilting of the seatback when the seat arrangement is changed between the seating state and the entry/exit state.

3. The vehicular seat device according to claim 2, further comprising a lock member pivotably provided on the seat cushion frame, wherein the lock member is urged in such a direction as to engage with the first end of the second linking member, and the lock member is engaged with the first end of the second linking member when the seat arrangement is the seating state or the retracted state.

4. The vehicular seat device according to claim 2,
    wherein the cooperation portion further includes a third linking member whose first end is pivotably linked to the vehicle floor member, and whose second end is pivotably and detachably linked to an engagement portion provided on the second linking member, and wherein when the seat arrangement is changed from the seating state to the entry/exit state, the second end is kept linked to the engagement portion, and when the seat arrangement is changed from the seating state to the retracted state, the second end is disengaged from the engagement portion, and wherein when the seat arrangement is changed from the seating state to the entry/exit state, the posture of the seat cushion is changed by causing the second linking member to rotate due to a difference between a locus of the second end of the third linking member and a locus of the second end of the second linking member that are involved in the tilting of the seatback.

5. The vehicular seat device according to claim 4, wherein the first end of the third linking member is pivotably linked to a support bracket as the vehicle floor member.

6. The vehicular seat device according to claim 4, wherein the second linking member has an extension portion in the second end, and the engagement portion is provided in the extension portion.

7. The vehicular seat device according to claim 1, wherein the cooperation portion includes:
a first linking member whose first end is pivotably linked to a vehicle floor member;
a second linking member whose first end is fixed to the seat cushion frame and whose second end is pivotably linked to a seatback frame of the seatback; and
a third linking member whose first end is pivotably linked to a second end of the first linking member, and whose second end is pivotably linked to the seatback frame, and which, together with the first linking member, supports the seat cushion when the seat arrangement is the seating state; wherein
the drive mechanism is constructed so as to be able to drive the second linking member rotationally about the second end of the second linking member synchronously with the tilting of the seatback, and that changes the posture of the seat cushion via the second linking member.

8. The vehicular seat device according to claim 7, wherein the cooperation portion further includes a fourth linking member whose first end is pivotably linked to a position on the second linking member remote from the second end of the second linking member, and whose second end is pivotably and detachably linked to an engagement portion that is provided on the base member, and wherein when the seat arrangement is changed from the seating state to the entry/exit state, the second end is kept linked to the engagement portion, and when the seat arrangement is changed from the seating state to the retracted state, the second end is disengaged from the engagement portion, and
wherein when the seat arrangement is changed from the seating state to the entry/exit state, the posture of the seat cushion is changed by causing the second linking member to rotate due to a difference between a locus of the first end of the fourth linking member and a locus of the second end of the second linking member that are involved in the tilting of the seatback.

9. The vehicular seat device according to claim 7, wherein the second linking member has an extension portion on the second end, and the first end of the fourth linking member is pivotably linked to a distal end of the extension portion.

10. The vehicular seat device according to claim 7, wherein the third linking member has a boomerang shape.

11. The vehicular seat device according to claim 2, wherein:
the first force transmission member is provided coaxially with a center of tilt of the seatback in the reclining mechanism, and is restricted in pivoting when the seat arrangement is changed between the seating state and the entry/exit state; and
the second force transmission member is provided on the second end of the second linking member, and is rotationally driven by the first force transmission member so as to change the posture of the seat cushion synchronously with the tilting of the seatback when the seat arrangement is changed between the seating state and the entry/exit state.

12. The vehicular seat device according to claim 11, further comprising a lock pin that is provided on the base member and that is engaged with and disengaged from a cutout that is formed in the first force transmission member.

13. The vehicular seat device according to claim 12, wherein the lock pin is engaged with the cutout when the seat arrangement is the entry/exit state, and the lock pin is disengaged from the cutout when the seat arrangement is changed to the retracted state.

14. The vehicular seat device according to claim 1, wherein the base member is adjustable in a longitudinal position relative to the vehicle by a longitudinal position adjustment mechanism.

15. The vehicular seat device according to claim 1, wherein the member of the cooperation portion has a boomerang shape and includes one end being pivotably linked to a frame of the seat cushion.

16. The vehicular seat device according to claim 1, wherein the second transmission member and the idle gear are configured to revolve around the first transmission member, which is restricted in pivoting, when the seat arrangement is changed between the seating state and the entry/exit state.

17. The vehicular seat device according to claim 16, wherein
the idle gear is configured to rotate counterclockwise and the second force transmission member is configured to rotate clockwise, when the seat arrangement is changed between the seating state and the entry/exit state.

18. The vehicular seat device according to claim 1, wherein the first force transmission member and the second force transmission member are selected from the group consisting of gears, friction wheels, and a combination of a pulley and a force transmission member wrapped on a pulley.

19. A vehicular seat device comprising:
a seat cushion;
a seatback which is provided on a base member via a reclining mechanism and whose inclination angle is adjustable;
a cooperation portion that changes a posture of the seat cushion synchronously with tilting of the seatback; and
a drive mechanism configured to rotationally drive a member of the cooperation portion about a position on the seatback, the drive mechanism including a first force transmission member, a second force transmission member, and an idle gear which is located between the first force transmission member and the second force transmission member and which meshes with the first force transmission member and the second force transmission member, the second force transmission member being coupled coaxially to the member of the cooperation portion and being configured to be rotationally driven;
wherein as seat arrangements, the vehicular seat device assumes an entry/exit state in which the seatback is tilted forward and the seat cushion is in a flipped position, a retracted state in which the seat cushion is moved forward downward relative to a vehicle and the seat cushion is superimposed on an upper side of the seatback, and a seating state in which the seatback is not tilted forward, and the seat cushion is not moved forward downward relative to the vehicle or the seat cushion is not in the flipped position, and the seat arrangement is changed via the cooperation portion; and wherein the member of the cooperation portion has a boomerang shape and includes one end being pivotably linked to a frame of the seat cushion.

20. A vehicular seat device comprising:

a seat cushion;

a seatback which is provided on a base member via a reclining mechanism and whose inclination angle is adjustable;

a cooperation portion that changes a posture of the seat cushion synchronously with tilting of the seatback; and a drive mechanism configured to rotationally drive a member of the cooperation portion about a position on the seatback, the drive mechanism including a first force transmission member, a second force transmission member, and an idle gear which is located between the first force transmission member and the second force transmission member and which meshes with the first force transmission member and the second force transmission member, the second force transmission member being coupled coaxially to the member of the cooperation portion and being configured to be rotationally driven;

wherein as seat arrangements, the vehicular seat device assumes an entry/exit state in which the seatback is tilted forward and the seat cushion is in a flipped position, a retracted state in which the seat cushion is moved forward downward relative to a vehicle and the seat cushion is superimposed on an upper side of the seatback, and a seating state in which the seatback is not tilted forward, and the seat cushion is not moved forward downward relative to the vehicle or the seat cushion is not in the flipped position, and the seat arrangement is changed via the cooperation portion;

wherein the second transmission member and the idle gear are configured to revolve around the first transmission member, which is restricted in pivoting, when the seat arrangement is changed between the seating state and the entry/exit state; and wherein the idle gear is configured to rotate counterclockwise and the second force transmission member is configured to rotate clockwise, when the seat arrangement is changed between the seating state and the entry/exit state.

* * * * *